US012086846B2

(12) United States Patent
Bordeleau et al.

(10) Patent No.: US 12,086,846 B2
(45) Date of Patent: *Sep. 10, 2024

(54) SYSTEMS AND METHODS FOR REMOTE COLLECTION OF ELECTRONIC DEVICES FOR VALUE

(71) Applicant: A La Carte Media Inc., Montreal (CA)

(72) Inventors: David Bordeleau, Montreal (CA); Tony Mastronardi, Montreal (CA)

(73) Assignee: A LA CARTE MEDIA, INC., Montreal (CA)

( * ) Notice: Subject to any disclaimer, the term of this patent is extended or adjusted under 35 U.S.C. 154(b) by 154 days.

This patent is subject to a terminal disclaimer.

(21) Appl. No.: 17/225,199

(22) Filed: Apr. 8, 2021

(65) Prior Publication Data

US 2021/0224867 A1   Jul. 22, 2021

Related U.S. Application Data

(63) Continuation of application No. 16/432,527, filed on Jun. 5, 2019, now Pat. No. 10,977,700, which is a
(Continued)

(51) Int. Cl.
*G06Q 30/02* (2023.01)
*G06Q 10/30* (2023.01)
(Continued)

(52) U.S. Cl.
CPC ......... *G06Q 30/0278* (2013.01); *G06Q 10/30* (2013.01); *G06Q 20/18* (2013.01); *G06T 7/0002* (2013.01); *G07F 7/06* (2013.01)

(58) Field of Classification Search
CPC ........ G06Q 30/02; G06Q 10/30; G06Q 10/00; G06Q 20/18; G06Q 20/208
(Continued)

(56) References Cited

U.S. PATENT DOCUMENTS 7,881,965 B2 * 2/2011 Bowles ............... H04M 1/0287
                                                            705/308
8,195,511 B2 * 6/2012 Bowles ............. G06Q 30/0278
                                                            705/308
(Continued)

FOREIGN PATENT DOCUMENTS

WO   WO 2012/138679 A1   10/2002
WO   WO 2010/040116 A1    4/2010
WO   WO 2014/165146 A1   10/2014

OTHER PUBLICATIONS

Extended European Search Report in corresponding EP Appln. No. 16792261.6 dated Sep. 5, 2018.
(Continued)

*Primary Examiner* — Olusegun Goyea
(74) *Attorney, Agent, or Firm* — Nixon & Vanderhye, PC

(57) ABSTRACT

A kiosk for accepting a portable electronic device from a client in exchange for payment includes a display, one or more cameras, a portable device receiving arrangement, a payment dispensing arrangement, and a communication connection to a remote server and/or operator. The kiosk is configured to, in conjunction with the remote server and/or operator, control an application program executing on the portable electronic device and one or more the cameras to detect characteristics of the portable electronic device. The kiosk is also configured to determine a value for the portable electronic device based upon aspects including the detected characteristics, and to display the determined value on said at least one display for approval by the client. Subsequently, based upon the determined value, the kiosk provides a payment to the client via the payment dispensing arrangement, and deposits the portable electronic device in the kiosk for subsequent collection.

20 Claims, 31 Drawing Sheets

Related U.S. Application Data continuation-in-part of application No. 15/153,137, filed on May 12, 2016, now Pat. No. 10,339,509.

(60) Provisional application No. 62/160,115, filed on May 12, 2015.

(51) Int. Cl.
*G06Q 20/18* (2012.01)
*G06T 7/00* (2017.01)
*G07F 7/06* (2006.01)

(58) Field of Classification Search
USPC ............ 705/14.37, 306, 308, 26.3, 23
See application file for complete search history.

(56) References Cited

U.S. PATENT DOCUMENTS

| | | | |
|---|---|---|---|
| D669,891 S | 10/2012 | Bowles | |
| 2006/0200550 A1* | 9/2006 | Nelson | H04L 65/1101 709/224 |
| 2008/0281691 A1* | 11/2008 | Pearson | G07F 7/06 361/679.01 |
| 2009/0018890 A1* | 1/2009 | Werth | G06Q 10/063112 705/7.14 |
| 2010/0169231 A1* | 7/2010 | Bowles | G07F 7/06 705/308 |
| 2010/0228676 A1* | 9/2010 | Librizzi | G06Q 50/00 705/306 |
| 2011/0235853 A1* | 9/2011 | Bowles | G06Q 10/30 382/100 |
| 2012/0191562 A1* | 7/2012 | Bowles | G06Q 10/30 705/308 |
| 2012/0246083 A1* | 9/2012 | Bowles | G07F 7/06 705/306 |
| 2012/0294490 A1* | 11/2012 | Bowles | G06Q 30/0237 382/103 |
| 2013/0046611 A1* | 2/2013 | Bowles | G06Q 30/0278 705/14.37 |
| 2013/0046699 A1* | 2/2013 | Bowles | G06Q 50/00 705/306 |
| 2013/0124426 A1* | 5/2013 | Bowles | H04M 1/0287 705/308 |
| 2013/0144797 A1* | 6/2013 | Bowles | G06Q 30/00 705/306 |
| 2013/0191236 A1* | 7/2013 | Bowles | G06Q 30/08 705/308 |
| 2013/0198089 A1* | 8/2013 | Bowles | G06Q 30/08 705/308 |
| 2013/0198144 A1* | 8/2013 | Bowles | G06Q 10/30 707/668 |
| 2014/0156883 A1* | 6/2014 | Bowles | G06F 13/10 710/33 |
| 2015/0066677 A1* | 3/2015 | Bowles | G07F 7/06 705/26.3 |
| 2015/0339736 A1* | 11/2015 | Bennett | G06Q 30/0278 705/306 |
| 2015/0356637 A1* | 12/2015 | Graffia, II | G06Q 20/405 705/306 |
| 2016/0098689 A1* | 4/2016 | Bowles | G06Q 20/18 705/23 |
| 2016/0132840 A1* | 5/2016 | Bowles | H04M 1/0287 705/306 |
| 2016/0275518 A1* | 9/2016 | Bowles | G06V 40/166 |

OTHER PUBLICATIONS

International Search Report and Written Opinion dated Sep. 22, 2016.

Japanese Office Action for Application No. 2021-032080 dated Apr. 26, 2022 with English translation, 6 pages.

\* cited by examiner

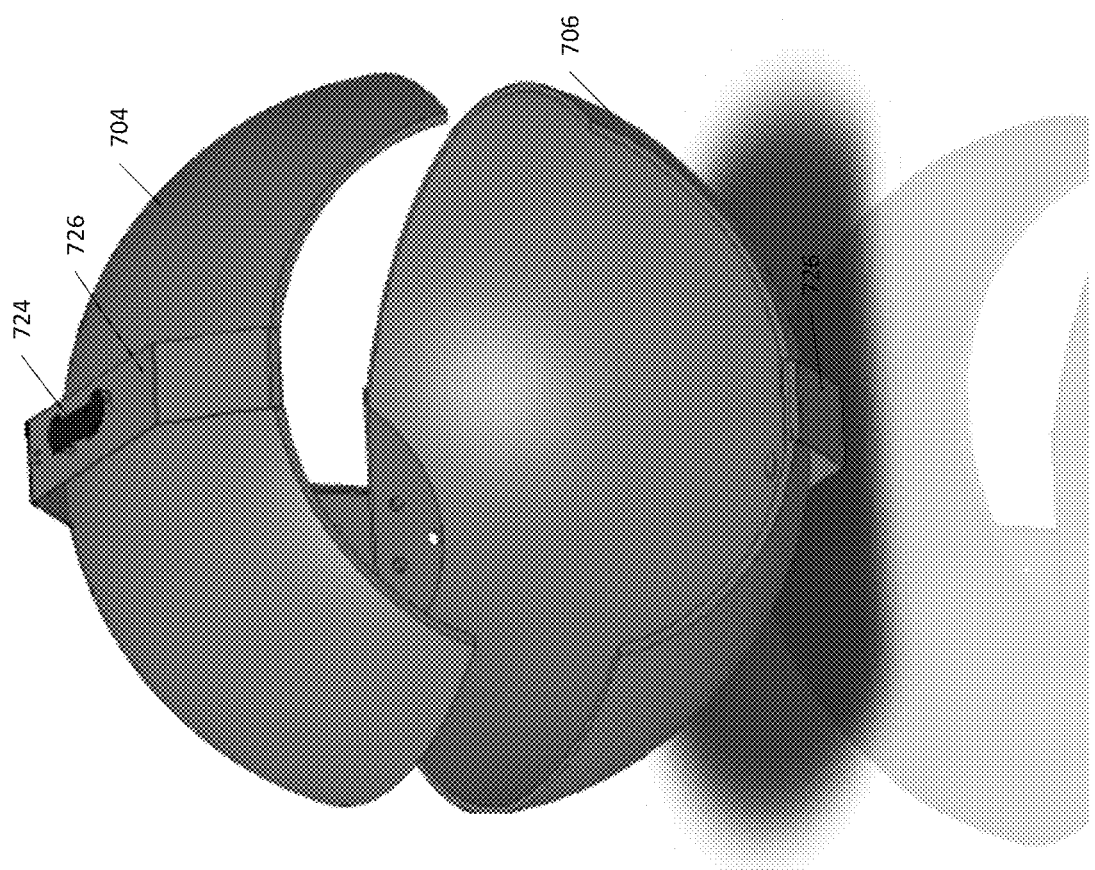

SYSTEMS AND METHODS FOR REMOTE COLLECTION OF ELECTRONIC DEVICES FOR VALUE

CROSS-REFERENCE TO RELATED APPLICATIONS

This application is a continuation of U.S. patent application Ser. No. 16/432,527 filed Jun. 5, 2019 which is a continuation-in-part of U.S. application Ser. No. 15/153,137 filed May 12, 2016, now U.S. Pat. No. 10,339,509 issued Jul. 2, 2019, which claims the benefit of U.S. Provisional Patent Application No. 62/160,115 filed on May 12, 2015, which is hereby incorporated by reference in its entirety.

FIELD OF THE TECHNOLOGY

The technology presented herein relates to systems and methods related to the remote collection of small electronic devices in exchange for value. For example, the technology presented herein may be used in a distributed set of kiosks configured to accept a client's used electronic device, such as, for example, a smartphone, tablet computer, a smart watch or the like, and to provide the client with an amount in money for an estimated value of that accepted used electronic device.

BACKGROUND

Many people often find themselves in situations where, after having bought a new smartphone or some other consumer electronic device to replace an older device, they would like to conveniently and safely dispose of the old device. In many instances, such persons may desire to trade the old device for some monetary gain. Although they may use a service such as Ebay or the like to list and sell the old device, such avenues for disposing old devices are not convenient in that one must manually perform a number of steps such as listing the device for sale, monitoring purchase offers, provide the buyer with the device via mail or other manner, wait a relatively long time before receiving the money from the buyer, and even after the transaction has completed, still run the risk of subjecting oneself to adverse comments by the buyer and/or return of the device.

Distributed collection centers, such as collection kiosks (herein sometimes also referred to as "booths") that are configured to accept a client's smartphone and to then provide the client with an amount of money corresponding to an estimated value are known, such as those provided by eco ATM™. However, further improvements are desired in order to make the process of trading in old consumer electronic devices more convenient for clients and more reliable and efficient for the kiosk operators (e.g., kiosk owners, entity responsible for collecting electronic devices from multiple kiosks for subsequent trading).

Embodiments disclosed in this application provide for remote distributed collection kiosks for efficiently collecting certain electronic devices.

SUMMARY

A kiosk for accepting a portable electronic device from a client in exchange for payment includes a display, one or more cameras, a portable device receiving arrangement, a payment dispensing arrangement, and a communication connection to a remote server and/or operator. The kiosk is configured to, in conjunction with the remote server and/or operator, control an application program executing on the portable electronic device and one or more of the cameras to detect characteristics of the portable electronic device. The kiosk is also configured to determine a value for the portable electronic device based upon aspects including the detected characteristics, and to display the determined value on said at least one display for approval by the client. Subsequently, based upon the determined value, the kiosk provides a payment to the client via the payment dispensing arrangement, and deposits the portable electronic device in the kiosk for subsequent collection.

A system comprising a plurality of call center terminals, a central server, and a plurality of kiosks, such as above, connected to the call center terminals and the central server via a network is also described.

BRIEF DESCRIPTION OF THE DRAWINGS

FIGS. 7-17 schematically illustrates aspects of a device scanning chamber and/or a drum assembly included in electronic device collection kiosks, according to some embodiments.

DETAILED DESCRIPTION

Exemplary embodiments of this disclosure include an electronic device collection kiosk that facilitates remote distributed collection of electronic devices in exchange for a monetary value or other value. The electronic devices that may be collected in these kiosks may include consumer electronic devices or portable electronic devices such as, but not limited to, smartphones, tablet computers, smart watches, game devices, personal health monitoring devices, or other processor-based electronic devices. In some cases, it may be expected that the kiosks described herein will more frequently collect smartphones and the like which are in widespread use and are often replaced with newer versions on a relatively short (e.g., 2-4 years) replacement cycle by many consumers. These embodiments will be described with reference to the accompanying drawings. It should be noted that the embodiments described below are illustrative only, in order to describe, for example, the electronic device collection kiosk according to this disclosure is formed and operated, and it is not intended to limit the electronic device collection kiosk or the like according to this disclosure to specific configurations described below. Other specific configurations may be employed as appropriate according to the embodiments.

Figure 1:
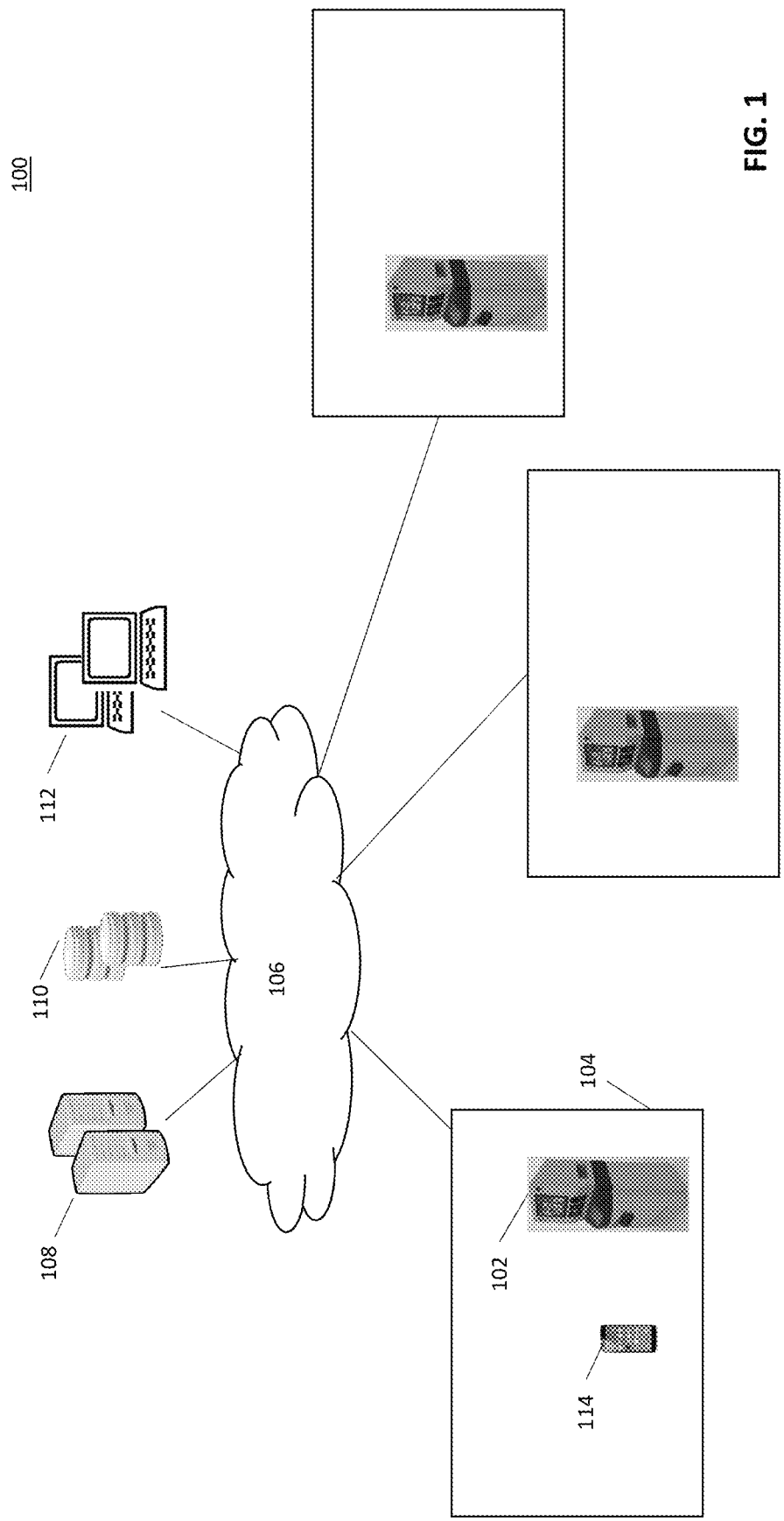
FIG. 1 illustrates a system view of a network of remote distributed electronic device collection kiosks, according to some embodiments.

FIG. 1 illustrates a system 100 comprising a network of distributed electronic device collection kiosks, according to certain example embodiments. A plurality of electronic device collection kiosks (hereinafter referred to simply as "kiosk(s)") 102 are located at various geographically distributed locations. Each kiosk 102 may be physically located within a kiosk premise 104. The kiosk premise 104 may be a building or other area under the supervision of, for example, a retail store or other enterprise.

The kiosks 102 are connected via one or more communication networks 106 to data processing servers 108, data storage 110 and a call center 112. The network 106 may include, but is not limited to, the Internet and/or one or more other communications networks such as local area networks, wide area network, cellular connection, and/or point-to-point communication connections.

The processing servers 108, storage servers 110 and call center 112 may be located at the same geographical location or at different locations. The processing servers 108 may include one or more of any type of computers and are configured to perform processing and/or analysis of data collected at the kiosks 102 and information related to the electronic devices that are being collected at the kiosks 102.

The data storage servers 110 are configured to store information related to electronic devices that may be collected at the kiosks, and data collected at the kiosks (e.g., session data, client information, information regarding consumer electronic devices submitted by clients for analysis, etc.). The data storage servers 110 may comprise any type of digital data storage devices and may use any type of database and/or file structure to collect and maintain the stored data.

The call center 112 is configured to enable one or more operators ("call center agents" or "call center operators") to interact with users (e.g., clients) who are close to any one of the kiosks 102. The interaction may include one or more of audio, video and data feed. For example, when a person is in close proximity to one of the kiosks 102 in order to submit his electronic device 114 to the kiosk, one or more operators via terminals in the call center 112 may interact with the client regarding the submission of electronic device 114. The interaction may be facilitated by the audio, video and/or data interfaces of the kiosk 102 and/or the user's device 114. In some example embodiments, the services provided by the call center operators may be grouped into two or more classes of services, as described below. In some embodiments, at least some of the call center operators may be fully or partially automated.

Figure 2B:
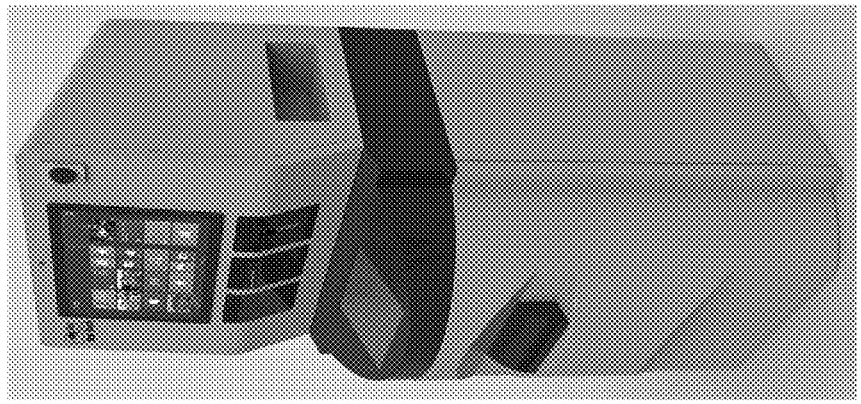
FIGS. 2A-B a front view and an angled view, respectively, of a model electronic device collection kiosk, according to some embodiments.
Figure 2A:
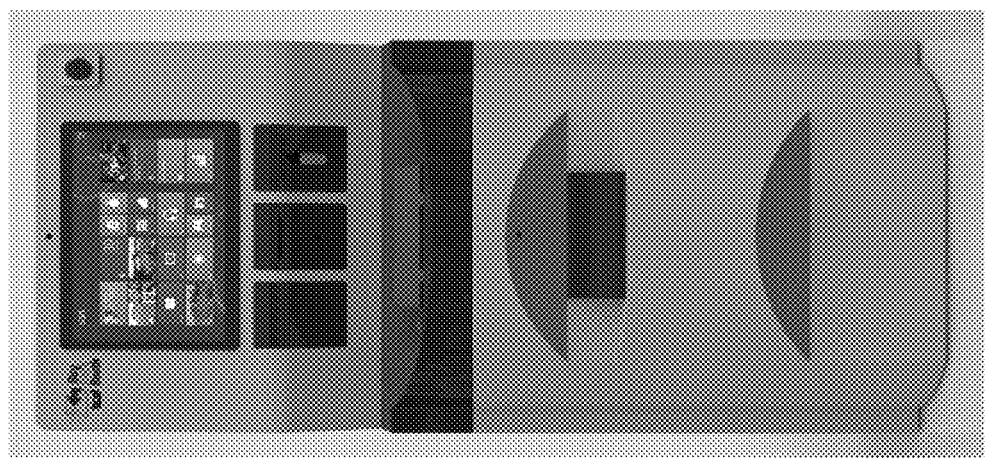
Figure 3:
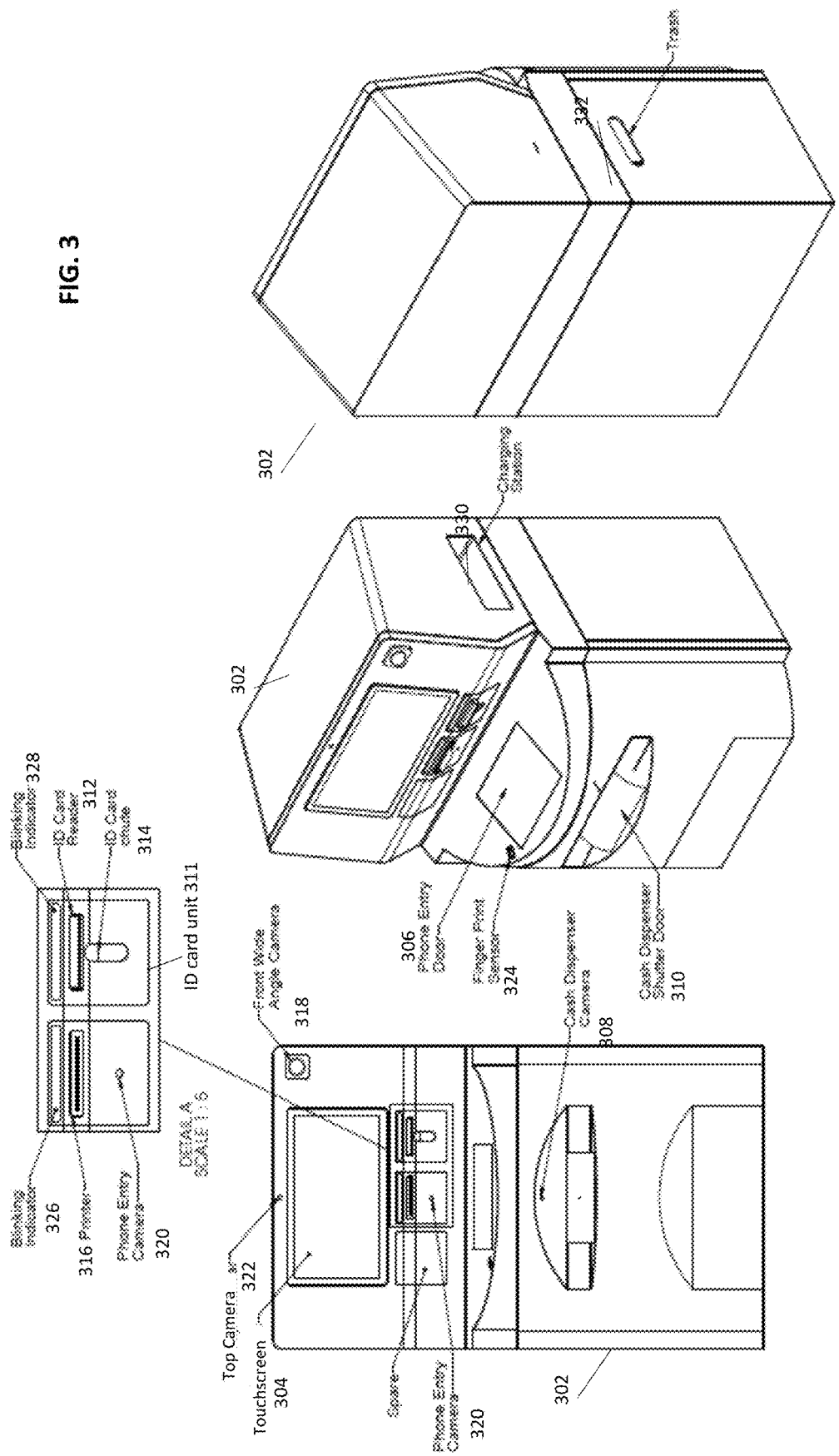
FIGS. 3-5 schematically illustrates various hardware aspects of an electronic device collection kiosk, according to some embodiments.
Figure 4:
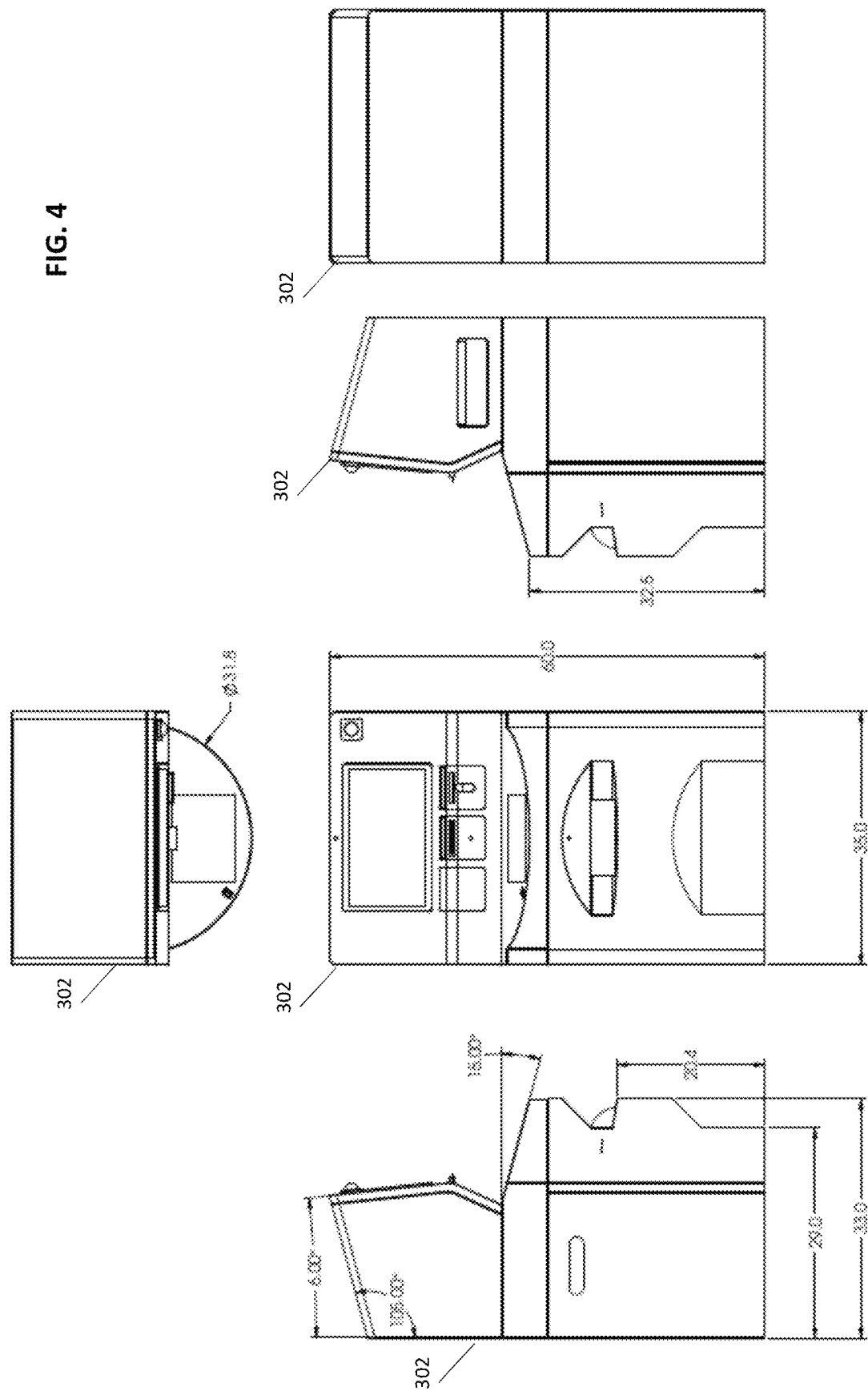
Figure 5:
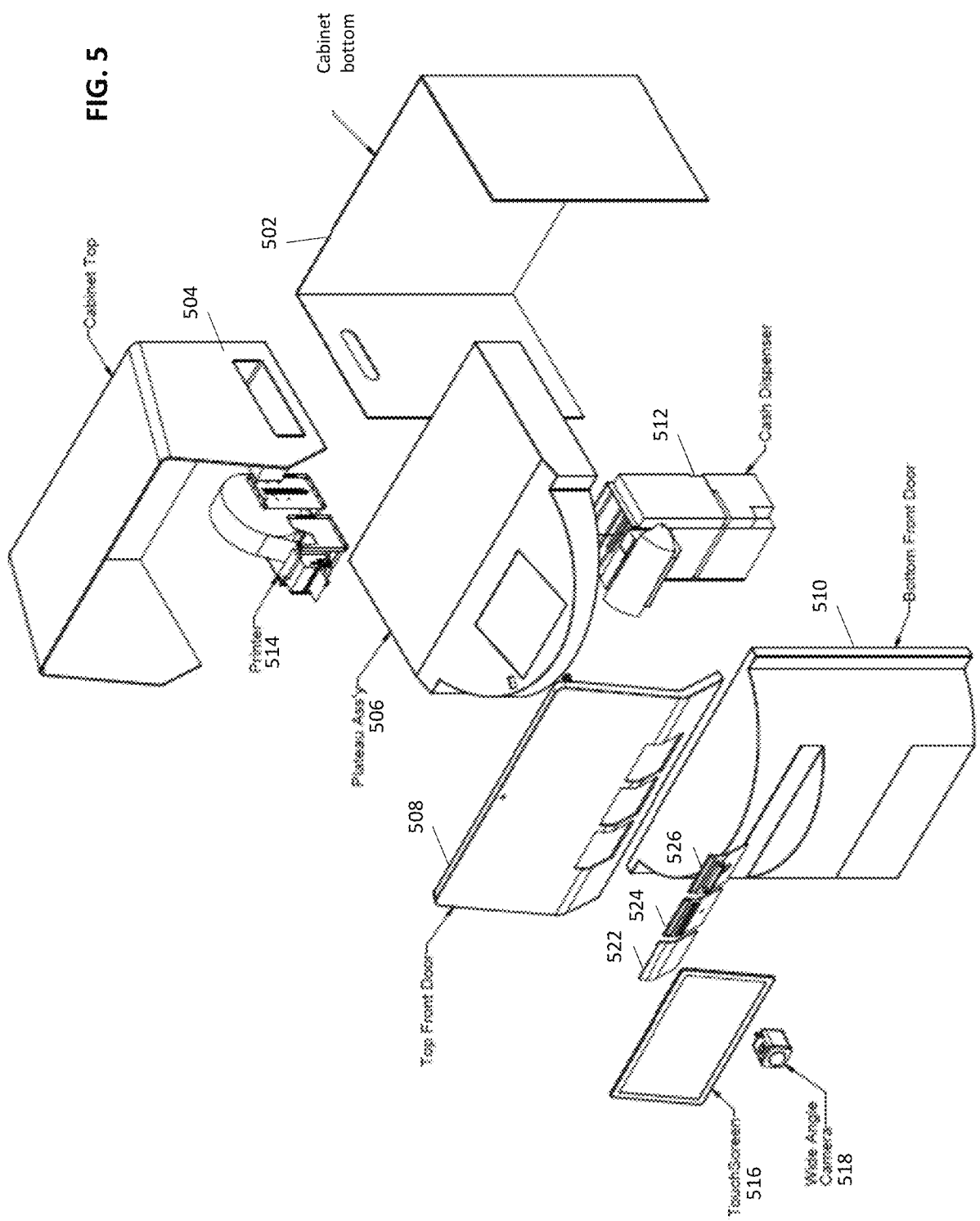

FIGS. 2A and 2B show a front view and an angled view, respectively, of a model electronic device collection kiosk according to certain example embodiments. FIGS. 3-5 schematically illustrates various aspects of an electronic device collection kiosk according to some embodiments.

FIG. 3 schematically illustrates a frontal view (left), an angled frontal view (middle) and an angled rear view (right) of an electronic device collection kiosk 302, according to certain example embodiments.

The kiosk 302 includes a screen 304 to display instructions and messages to the client. Screen 304 may be configured to display messages, images, and/or video. The displayed content may be stored in the kiosk, dynamically generated based upon interactions with the client and/or call center operator, and/or received over a network from an external source such as, for example, processing server 108, storage 110 and/or call center 112. In at least some embodiments, screen 304 may include a touchscreen (e.g. display screen including a touch-sensitive panel) by which the client can provide input to the kiosk using fingers and/or a stylus. The touchscreen may be configured to display a keyboard or the like for the client to provide inputs. In addition to, or in place of the keyboard, the touchscreen may provide displayed buttons and the like that the user can "touch" in order to provide inputs to the computer programs executed on kiosk 302.

The kiosk 302 includes a device entry door 306 that is opened in order for the client to submit the device for scanning and processing and also, in some cases, for the client to retrieve the device from the kiosk 302. The device entry door 306 is manipulated to control access to a scanning area, referred to herein as the camera chamber, where the device is scanned using one or more cameras. In certain example embodiments, device entry door 306 is electronically controlled to open only at certain points during a transaction with a client. For example, the door 306 may be controlled by the kiosk 302 to remain closed at all times except when the displayed messaging on screen 304 indicates that the client may now submit the device for scanning and processing or when the messaging indicates that the client may now retrieve the electronic device. In some embodiments, the device entry door 306 may be opened and/or closed manually by the client.

Kiosk 302 may also include a cash dispenser (not shown in FIG. 3) which has a related cash dispenser camera 308 and a cash dispenser shutter door 310 that controls access to the cash dispenser. The cash dispenser is configured to dispense cash to the client, and has access to a known amount of money in stored cash of one or more value denominations. In certain example embodiments, the cash dispenser shutter door 310 is electronically controlled to provide access to the cash dispenser only at certain times during a transaction. The cash dispenser camera 308 is configured to monitor the cash dispenser door. In some embodiments, the cash dispenser camera 308 is selectively activated to take images and/or record video when the cash dispenser shutter door is activated. For example, during an interval starting shortly before the cash dispenser shutter door is opened to shortly after it is closed, the cash dispenser camera may be activated recording video. In some embodiments, one or more other cameras of the Kiosk too can be activated for all or some part of the duration in which the cash dispenser camera is active. The recorded images/video may be stored in association with an identification of the client or clients who are currently interacting with the kiosk.

An ID card unit 311 is provided to accept an ID card, such as, for example, a driver's license. The ID card unit 311 may include an ID card reader 312 and an ID card chute 314. The ID card reader 312 may be configured to accept a submitted ID card such as a driver's license, to move the ID card into a scan region (not separately shown), to read one or more of a magnetic stripe, a smart card chip, or an RFID in the ID card, and/or to scan or photograph one or both sides of that ID card while it is in the scan region. After the ID card has been processed in the ID card reader 312, it may be dropped into the ID card chute 314 or, in some embodiments, be returned through the same or similar card slot as it was put into. The ID card chute may have an electronically or manually controlled door which can be opened to retrieve the ID card. The ID card unit may have an indicator 328 to display status associated with the ID card reader. In some embodiments, the indicator 328 may include one or more indicator lights to indicate one or more its operational statuses such as, for example, ready to receive ID card, scanning in progress, ID card is in the chute. In some embodiments, the indicator 328 may include an LCD display screen in which short status messages can be displayed. In some other embodiments, the ID card unit 311 may include a camera that can capture images of a ID card in sufficient resolution, and associated optical character recognition (OCR) or other technology to process the captured images of the ID card to determine identification information. For example, with such a unit 311, the user of the kiosk may be prompted to hold each side of the ID card up to a camera for an image of sufficient resolution can be captured, and the captured images can be processed by OCR software to detect the associated driver license number, name etc. contained in the ID card.

A printer 316 incorporated into kiosk 302 may be configured to print one or more of receipts, estimates, labels, etc., as commanded by one or more processors in the kiosk. An indicator 326 may be associated with the printer to display its status. In some embodiments, the indicator 326 includes one or more indicator lights which may be associated with the printer to provide visual status of the printer's operation (e.g., "printer busy", "out of paper", etc.). In some other embodiments, the indicator 326 may be an LCD display screen.

The kiosk 302 may also have incorporated into it one or more outside-facing cameras, such as, for example, front wide angle camera 318, device entry monitoring camera 320, and top camera 322. The front wide angle camera 318 and top camera 322 can be configured to capture images of the client as he/she approaches the kiosk and/or interacts with the kiosk. The device entry monitoring camera 320 is configured to provide for monitoring the device entry door 306 and surrounding area, so that aspects relating to the submission of the device to the kiosk and retrieval of the device from the kiosk can be reliably confirmed. The cash dispenser monitoring camera 308 is another outward facing camera provided in at least some embodiments. The kiosk may be configured so that two or more of these cameras can be activated in a coordinated manner. For example, in some examples, one or more of the cameras may be activated based on a trigger detected by one of the cameras (e.g., motion detection from top camera 322 or wide angle camera 318), when triggered by opening of a controlled shutter or door of the kiosk, when the fingerprint reader is activated, when the touchscreen is touched, etc.

A fingerprint scanner 324 may be arranged on the surface of the kiosk 302 such that the client is provided the ability to conveniently provide a fingerprint scan via the kiosk 302. In various embodiments, the fingerprint of a user may be stored by the kiosk in association with the ID card of the client, and may be used in association with agreements etc. as the client's signature, and/or to provide access verification for one or more of the controlled shutters.

Kiosk 302 may also have incorporated in its structure a charging station 330 and/or a trash bin 332. The charging station 330 can be configured for providing clients with the capability to charge devices such as the electronic device which they wish to transact using the kiosk 302. In some embodiments, the charging station 330 includes power outlet such that the client can plug in his own power cord to charge his electronic device. In some other embodiments, one or more different charging cables/connecters of different types (e.g. connectors for iPhone, connector for Samsung Galaxy S5, different types of USB connectors, etc.) may be provided such that the client can select the appropriate charging cable. In yet other embodiments, a combination of the above two techniques may be provided. The charging station may be behind an electronically controlled door. The charging station may, in some embodiments, charge a plugged in device for long as it is left plugged in the charging station. In some other embodiments, the charging station may be configured to provide a measured charge for each plugged in device. The measured charge may be provided based upon a limited time allowed for charging, based upon limited duration and amount of power provided, or based upon a percentage of the battery being charged.

The trash bin 332 is designed to provide clients with the convenience of disposing small amounts of trash such as, for example, wrapping or packaging for electronic devices, labels, receipts, and additional parts associated with the electronic device that is submitted to the kiosk etc. In some embodiments, in place or in addition to the trash bin, another peripherals bin (accessory bin) is provided. The peripheral bin may be protected by a controlled door, and, in some embodiments, may be opened only for a client who has completed a predetermined stage of the transaction process (e.g., stage of actually submitting an electronic device to be scanned by the kiosk, stage of completing authentication by submitting the identification documents, etc.). The peripherals deposited into the bin may be collected in a chute. The collected peripheral etc., may be for purposes of recycling. However, in some embodiments, peripherals submitted to the peripheral bin may be tagged or marked as being associated with an electronic device submitted to the kiosk, so that, if necessary, the peripherals can be associated with the proper electronic device in a downstream activity.

FIG. 4 illustrates several schematic profile views of the kiosk 302, organized into an upper row and a lower row, according to certain example embodiments. In the lower row of images, a left side profile view (left most on page), a front profile view (second from left), a right profile view (third from left), and a rear profile view (right most in page) are shown. A top view (i.e., viewed from above) of kiosk 302 is shown in the upper row. As can be seen in FIG. 4, the charging station 330 and garbage bin 332 can be located on the sides of the kiosk because of their relatively infrequent expected use. The display screen may be slightly angled upwards so that it is more comfortably visible to a client of the kiosk. Fingerprint sensor 324 and electronic device deposit door 306 in a flat surface approximately at the level of a client's hands.

FIG. 5 illustrates more detail of certain parts of the kiosk 302. Kiosk cabinet bottom sides and back 502, cabinet top 504, top and bottom front doors 508 and 510, plateau assembly 506 are shown. Cash dispenser 512, printer 514, touchscreen 516, wide angle camera 518, and front covers 522, 524 and 526 for, respectively, the spare opening, printer opening and ID card unit opening shown in the top front door 508, are also illustrated.

Figure 6:
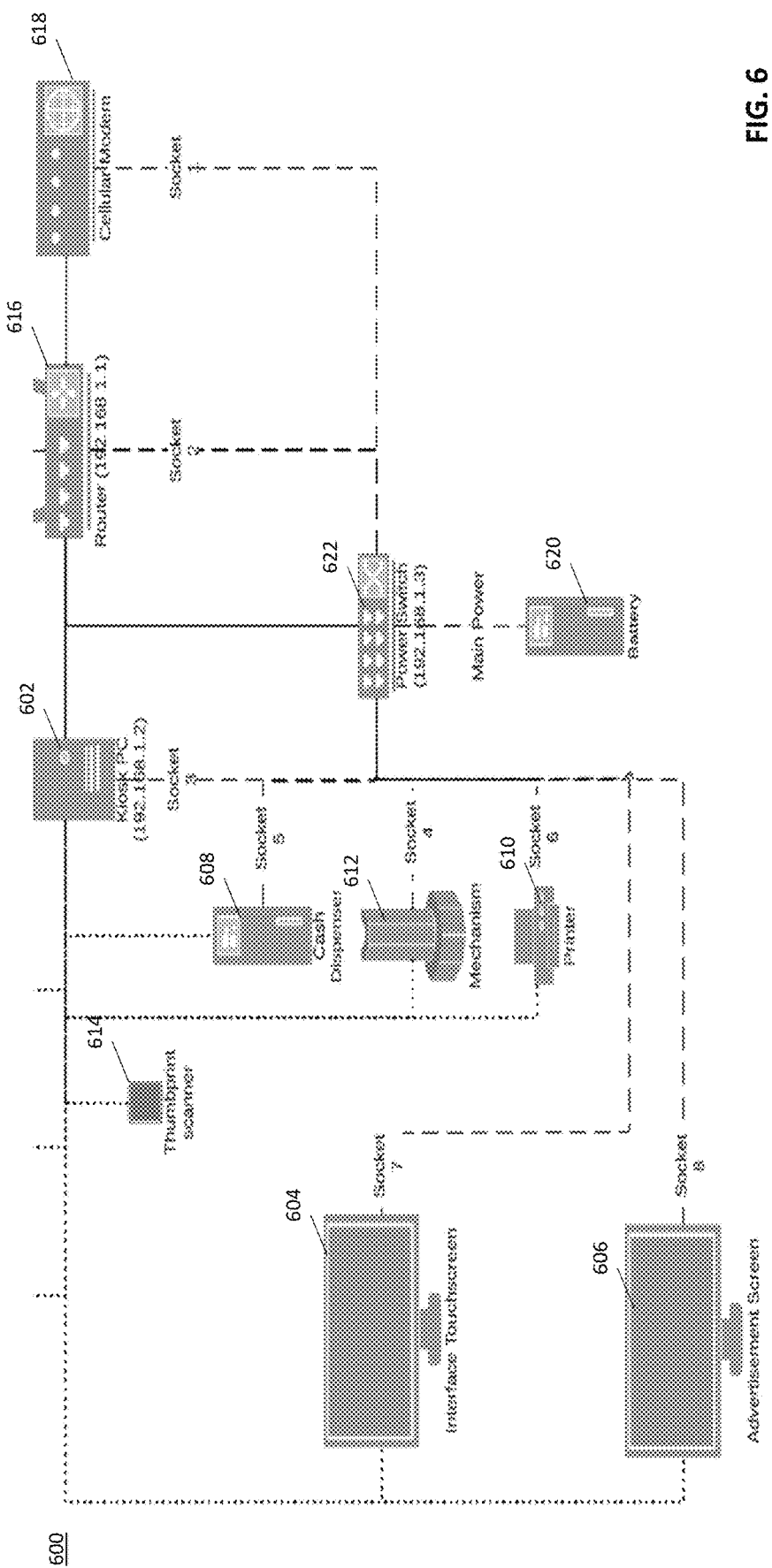
FIG. 6 schematically illustrates interconnections between components in an electronic device collection kiosk, according to an embodiment.

FIG. 6 schematically illustrates a network 600 connecting components in an electronic device collection kiosk such as kiosks 102 and 302, according to an embodiment. For example, according to some embodiments, kiosk 302 may include a kiosk computer 602, an interface touch screen 604, an advertising screen 606, a cash dispenser 608, a printer 610, a mechanism 612, a fingerprint scanner 614, a router 616, a modem 618, a battery 620, and a power switch 622.

According to some embodiments kiosk computer 602 may be based upon a platform such as, for example, Windows Embedded 8 Standard. The main graphical user interface screen(s) displayed by the kiosk computer 602 to clients or potential clients may be formed, for example, using Chromium (see, for example, https://www.chromium.org) as the container and using one or more of HTML5/Javascript/CSS as the language, and accessing libraries such as, for example, JQuery. The kiosk's main graphical user interface may include all graphical elements, animations, audio and logic associated with client interaction with the kiosk. The main GUI and/or kiosk computer 602 may communicate directly with server, such as processing server 108, and hardware service through AJAX calls and receives events through web sockets. Included in the main GUI or implemented separately is a digital sign interface for displaying marketing images and/or videos based on a predetermined or remotely-specified sequence. For example, the sequence may be specified from a remote server, such as processing server 108, using a digital sign administrative interface implemented in the kiosk software. The digital sign interface may also be formed using one or more languages such as HTML5/Javascript/CSS, libraries such as JQuery, and a Chromium container.

In addition to the main interface and the digital sign interface, the kiosk may also implement a service interface that may replace the main interface and/or the digital sign interface when activated by a service technician or other entity. The service interface may enable the service technician to access configurations, calibrations and system checks to help correct problems or issues with the kiosk. The service interface logic interacts directly with a hardware service through AJAX calls. The service interface may also be formed using one or more languages such as HTML5/Javascript/CSS, libraries such as JQuery, and a Chromium container.

The software logic implementing the hardware service may be created using a computer programming language such as C++, and using one or more of the libraries CURL, OpenCV, ZBar and DirectShow. The hardware service may be implemented as a Windows Service (e.g. and include automatic startup and recovery). The hardware service contains the logic that interacts with the Operating System and hardware peripherals on the kiosk 302. It may contain an HTTP server which listens for calls from the kiosk interface and service interface. It may also accepts web socket connections to send events to the interfaces. The service may be self-updating, self-configuring and self-healing. Self-updating means that, on startup, the service queries the server for potential updates and executes incremental updates until it reaches the latest version. In case of issues, the service reverts back to its previous known good version. Self-configuring means that, on startup, the service verifies Operating System configurations and corrects any discrepancies. It also verifies all its configuration options (i.e., COM Port numbers, Camera assignations) and tries to correct any issues automatically. Self-healing means that when a hardware error is encountered, the service will automatically power cycle the faulty device and try to re-initialize it before triggering a service call as a last resort.

The kiosk computer may, in some embodiments include a personal computer PC, having a CPU processor such as AMD A6-6400K, and a motherboard such as Gigabyte GA-F2A78M-D3H, with a 4 GB of RAM.

The touchscreen may be a model such as "ELO E496859 22" touchscreen having resolution of 1920×1080. The touchscreen may be connected to the kiosk computer via a DVI interface. The digital sign screen may, for example, have a resolution such as 1920×1080, and may be connected with a VGA interface. The device camera may include, for example, E-Con Systems See3CAMCU13, and may provide a resolution of 4912×3684. A lens such as a 6 mm focal length, may be used. A USB connection may be used for communication with the kiosk. The face camera may include a USB connected camera such as "E-on systems See3CAMCU50" at a resolution such as 2654×1956 and lens 2.8 mm focal length. The security camera may include a USB connected camera such as an "E-Con Systems See3CAMCU50" camera with a 2.1 mm focal length and 2654×1956 resolution.

The kiosk router may include a router such as TP-Link TL-WDR3600 running firmware such as OpenWRT 14.07. The router includes connections: WAN Ethernet to the modem; LAN Ethernet to the PC; and LAN Ethernet to the Power Switch. The router may be flashed with OpenWRT and then configured to the specific needs of the kiosk. The router may be configured, for example, to communicate with the hardware service when WiFi connections are made and when the kiosk app is downloaded from an app store or the like. The router may expose the interface to open and close the WiFi radio which is controlled by the hardware service. A modem may provide the Ethernet connection to the router and may be based upon a cellular connection.

The mechanism may include an Arduino Mega controller connected to a virtual COM port through USB. The Arduino firmware may be configured to only contain simple logic to control the motors and lights while making sure there is no interference. The hardware service carries all or most of the logic associated with the good functioning of the mechanism.

The cash dispenser may be a model such as, WBE GBM-10M, connected to a virtual COM port through USB. The kiosk power switch may be an item such as a Digital Loggers LPC738270 switch. The power switch may be connected via Ethernet to the router and may power the battery for charging. In some embodiments, the power switch may be an Ethernet managed power switch. All devices are connected to individual sockets which can be controlled through HTTP calls. The hardware service may use this functionality to power cycle faulty devices. The battery may be of the UPS variety. In some embodiments the UPS may at least have enough power at all times so that current ongoing processing can be completed in case of a power failure. For example, the UPS may be configured to have at least a predetermined amount of power required for the kiosk to return a trade device that has been deposited in the kiosk and to close all access doors before shutting down in the case of a power failure.

The server may be hosted by a cloud provider such as, for example, Amazon Web Services (AWS), and may use an operating system such as Ubuntu 14.04, and include subsystems such as Apache, PHP, MongoDB, OpenERP. The server may operate a plurality of call center queues. In some embodiments, the server keeps a web socket connection alive with each kiosk to keep track of its status and active session. When the logic dictates that a call center agent should be involved in the session, the session is put into queue based on the agent level required. Sessions are then pushed to an available agent. The queues may be services based on a round-robin servicing discipline.

In some embodiments, kiosk sessions are archived by the server. All session information may be contained in JSON format. At the end of a session, this data file is inserted into a database (e.g., MongoDB). The archived sessions can be analyzed and evaluated to determine patterns. For example, most frequently occurring defects for each type of electronic device, most frequent combinations of defects, etc. can be determined from such analysis, and may be used in enhancing the process of device acceptance in the kiosk.

In some embodiments, OpenERP is used to keep track of kiosk hardware inventory, trade device inventory, sales transactions and accounting. Each completed kiosk session inserts a transaction into the ERP system. Once the trade devices are picked up on location, a purchase order is created for the phones expected to be shipped by the kiosk operator.

The call center agent interface creates a web socket connection to the server and waits for a session to be assigned. Agents have a level that dictates the type of session they can handle (described below). The interface may be formed using one or more languages such as HTML5/Javascript/CSS, libraries such as JQuery, and a container such as Chromium.

The call center agents may be classified into a plurality of levels and assigned for servicing clients according to the classification. In some embodiments, the system may provide for three levels of call center agents. A level 1 agent cannot interact directly with the client. The only types of session a level 1 agent handles are best case scenarios where the ID and trade device needs to be verified. A level 2 agent can interact with the client to help him navigate the kiosk interface. He/she can also assess non-working trade devices and match them against a list the system offers based on the physical metrics retrieved. Level 2 agents can handle level 1 sessions. A level 3 agent can handle level 1 and 2 sessions but also has access to specific kiosk controls to fix and/or report problems on the kiosk.

In addition to the above, the system may also include an administration or supervisor interface. The interface may be formed using one or more languages such as HTML5/Javascript/CSS, libraries such as JQuery, and a container in the form of any browser. The supervisor interface connects to the server via web socket and receives events on all changes to the system. This lets the supervisor see the queues and kiosk statuses in real time. The supervisor has the ability to open any session (past or ongoing) and get real time updates of the progression and interactions with the agents. A set of tools is made available to diagnose, fix and report issues with kiosks.

Figure 7:
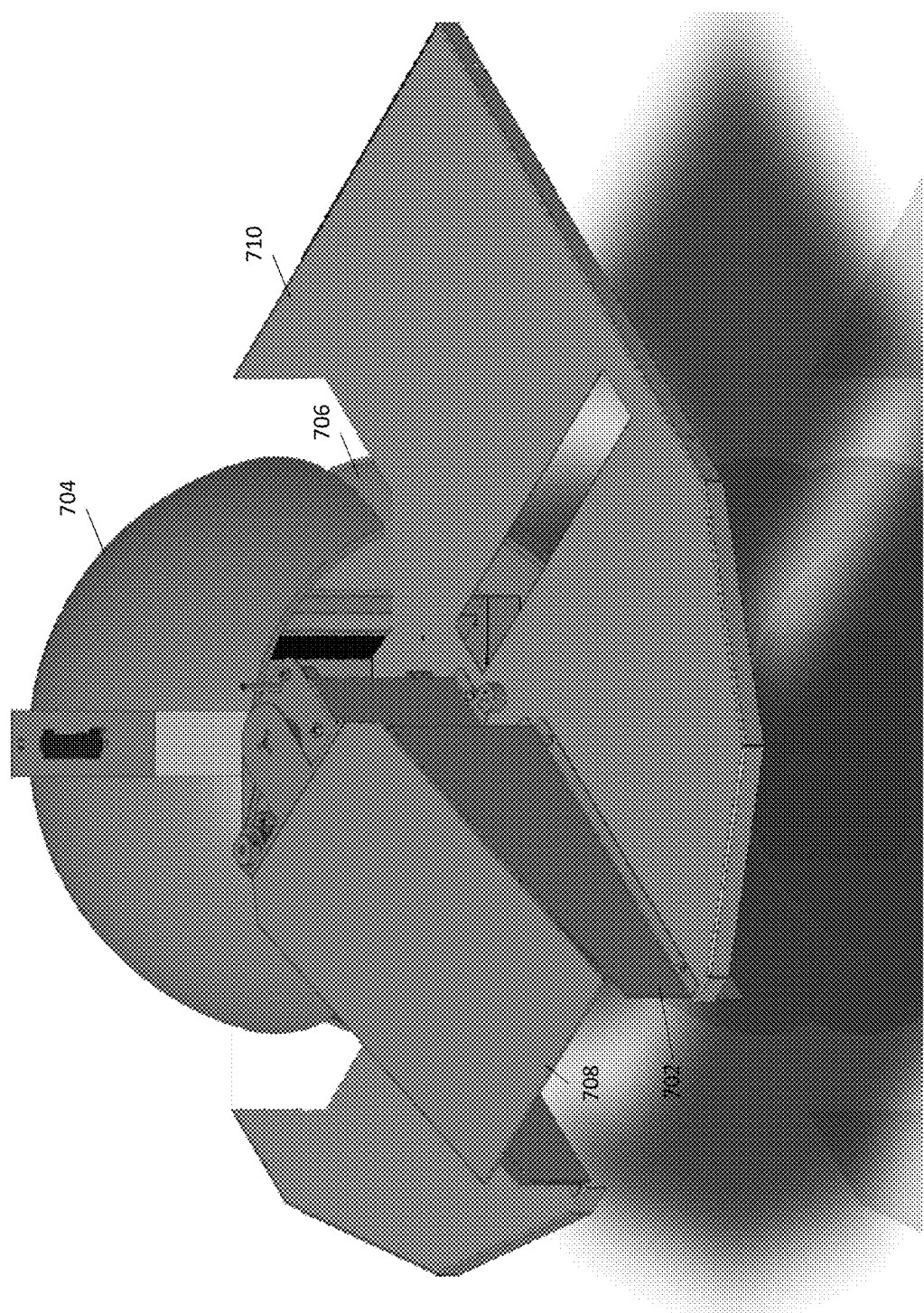

FIGS. 7-17 schematically illustrate aspects of a device scanning unit and/or a drum assembly included in kiosks 102, according to certain example embodiments. FIG. 7 illustrates a schematic view of the device scanning unit 700, according to an embodiment. The unit 700 includes a top dome 704 and a bottom dome 706 arranged such that they enclose a globe-shaped area which may be used as the device scanning chamber. A device entry unit 702 includes a device entry door 708. A plateau 710 is used to attach the device scanning unit 700 to the kiosk, such as kiosk 302.

The device scanning chamber may be made so that it facilitates accomplishing, among other things, a few goals. In an example embodiment, the device scanning chamber is designed to optimize for generating shadowless images of the device being scanned. For example, the device scanning chamber is configured for diffused lighting that bounces off of a matte white surface which is ideally suited for creating shadowless pictures.

The two transversely cut domes 704 and 706 are mounted opposite each other. Both domes rotate around the same radius and are mechanically linked together. This shape allows for the most compact space to offer the greatest picture taking benefit. For example, in the illustrated embodiment, this allows for capturing images throughout a 360-degree path around the device being scanned.

A camera is attached at the apex of one of the domes (e.g., at the apex of dome 704) and is focused internally to the center area (where the device will be moved while resting on a transparent glass tray) of the globe-shaped scanning chamber. The other dome serves as a constant neutral backdrop so that all of the full-front or full-back pictures taken of the device (e.g., smartphone) will have a completely monotone and uniform backdrop that can be cropped out, leaving a full, clear image of the smartphone.

The two domes allow for an almost infinite number of picture taking angles. This flexibility is highly beneficial when determining the condition of the device submitted. The flexibility in image taking can be especially important when trying to ascertain whether a device has a cracked screen, etc. By triggering the flash of the camera and taking pictures at varying angles, it is easier to make this determination based upon the captured images. Moreover, by enabling a call center operator to control at least some of the image taking, a more particularized, efficient, image taking process may be implemented. For example, in some embodiments, the call center operator may control aspects of the rotation of the domes, camera focus and/or angle, camera location, flash triggering timing and duration, level of light etc. In some embodiments, the call center operator may also control, for example, the movement of the tray holding the device inside the camera chamber, the positioning, movement and/or rotation of the device. In yet other embodiments, the call center operator may control the camera and associated equipment to deposit a predetermined quantity of some substance (e.g., powder, liquid etc.) to facilitate the quality and effectiveness of the captured images.

This design also allows, in some embodiments, for a gap to be had between where the two domes would meet (and where the tray holding the device travels through). In a completely sealed kiosk, this area is seen as almost black when taking pictures at about 45 degrees from the apex (e.g., when the tray holding the camera is horizontal). When rotating the camera and taking pictures, there may be certain angles that have this dark area reflect differently on the screen of the device. The dark area is a great help in determining whether there is a crack on the device's screen. For example, FIG. 15B illustrates image taking for crack detection.

In some embodiments, in addition to, or in place of a camera which images only visible light, a camera that images other light wavelengths, such as, but not limited to, infrared or ultra violet, and corresponding lighting sources can be used. In some embodiments, a full spectrum camera that can capture light in the visible and invisible (to the human eye) spectrum may be used. The inventors have noticed that certain types of hairline cracks on a screen are more effectively noticeable under ultra violet or infrared light rather than the normal visible light. The call center operator may control the light wavelength(s) for one or more of the images. In some embodiments, the selection of light wavelength(s) may be automated and may be controlled by the kiosk or the remote server, based upon the type of electronic device and/or features detected during the examination of the electronic device.

Some embodiments may, instead of the domes with moving cameras, utilize a series of fixed cameras and, in some cases, may control the electronic device to turn or move so that any desired angle of the electronic device can be imaged. One or more cameras and/or 3D imaging techniques may be used to obtain data that can be used in the determination of the device's dimensions, type, condition, features etc.

In some embodiments, the kiosk app (while executing on the device) may be used to cause a series of patterns (e.g., straight lines, circles, etc.) to be drawn on the display of the device, and concurrently one or more cameras can be used to capture the images on the device's display. Distortions in the patterns can be measured to assist in locating defects in the screen of the device. These techniques, as used in some embodiments, are believed to substantially improve the probability of detecting hairline cracks etc., before the device is accepted.

In still other embodiments, a 3D capturing apparatus alone or in combination with other cameras in the camera chamber may be used to assist with outlining the size, shape and color of the traded device.

Figure 8:
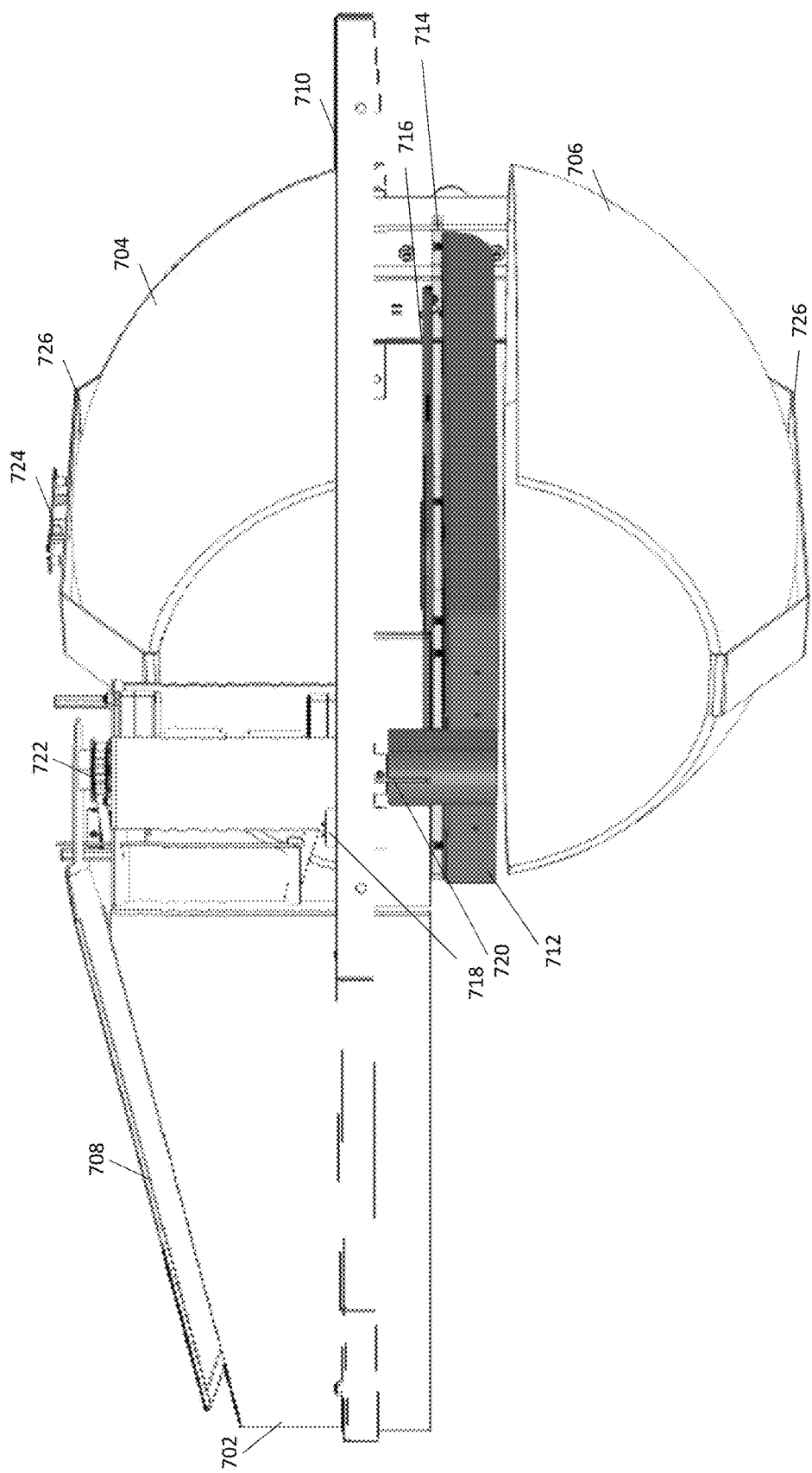

FIG. 8 illustrates a view of the device scanning unit 700 from a similar right angle as in FIG. 7, but in outline form of the structures for clarity. FIG. 8 illustrates, among other things, a device holding structure 712, device holding glass 714 attached to the device holding structure 712, and the device 716 placed on the device holding glass. The device holding structure 712 may be formed as a tray configured to hold the device holding glass 714. A motor 718 and shaft 720 assembly is actuated to move a device from the device entry area to the scanning area. An order in which this can be accomplished is as follows: the device entry door 708 is rotated from the closed position by actuating the motor and belt assembly 722; once the kiosk detects (with sensors) that the device is placed on the device holding glass 714, then the device holding structure is rotated to the camera area by actuating motor 718. A camera 724 is located at the apex of the top dome 704 and is held in place by a camera arm 726. The camera arm 726 may be formed as one unit or an interconnected plurality of units that span a substantial portion of the perimeter of both the top and bottom domes. A motor and belt assembly 722 operates to control the device entry door 708. Device entry door 708 may be controlled by the kiosk computer.

Figure 9:
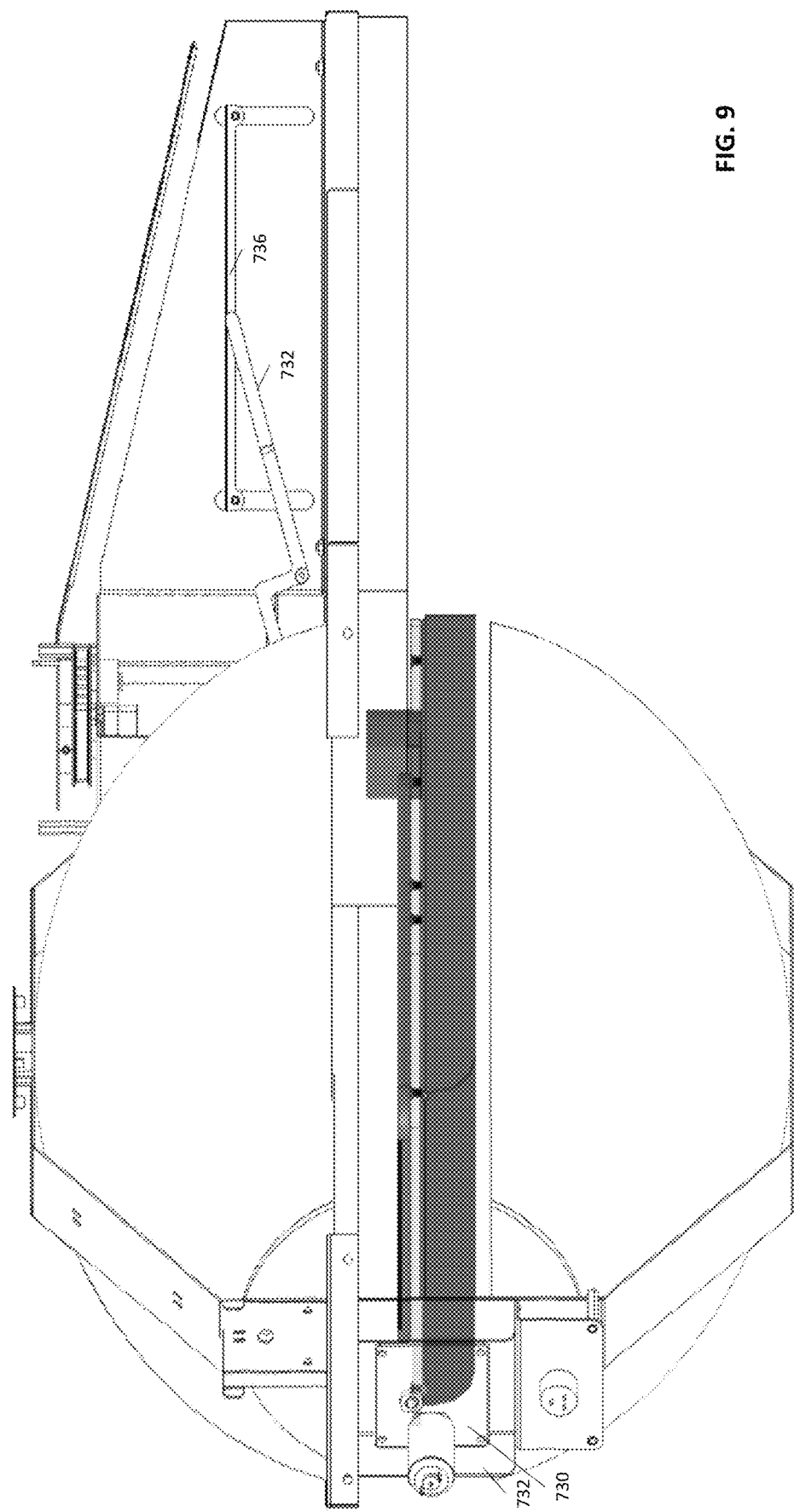

FIG. 9 illustrates a view of the device scanning unit 700 from an angle opposite (e.g. left angle) to that of FIG. 8 in outline form of the structures. FIG. 9 illustrates, among other things, a camera motor 730 and a camera motor holder 732. FIG. 9 also illustrates shutter actuator lever 734 which operate to actuate the shutter 736 to open when the device entry door 708 has been closed.

Figure 10:
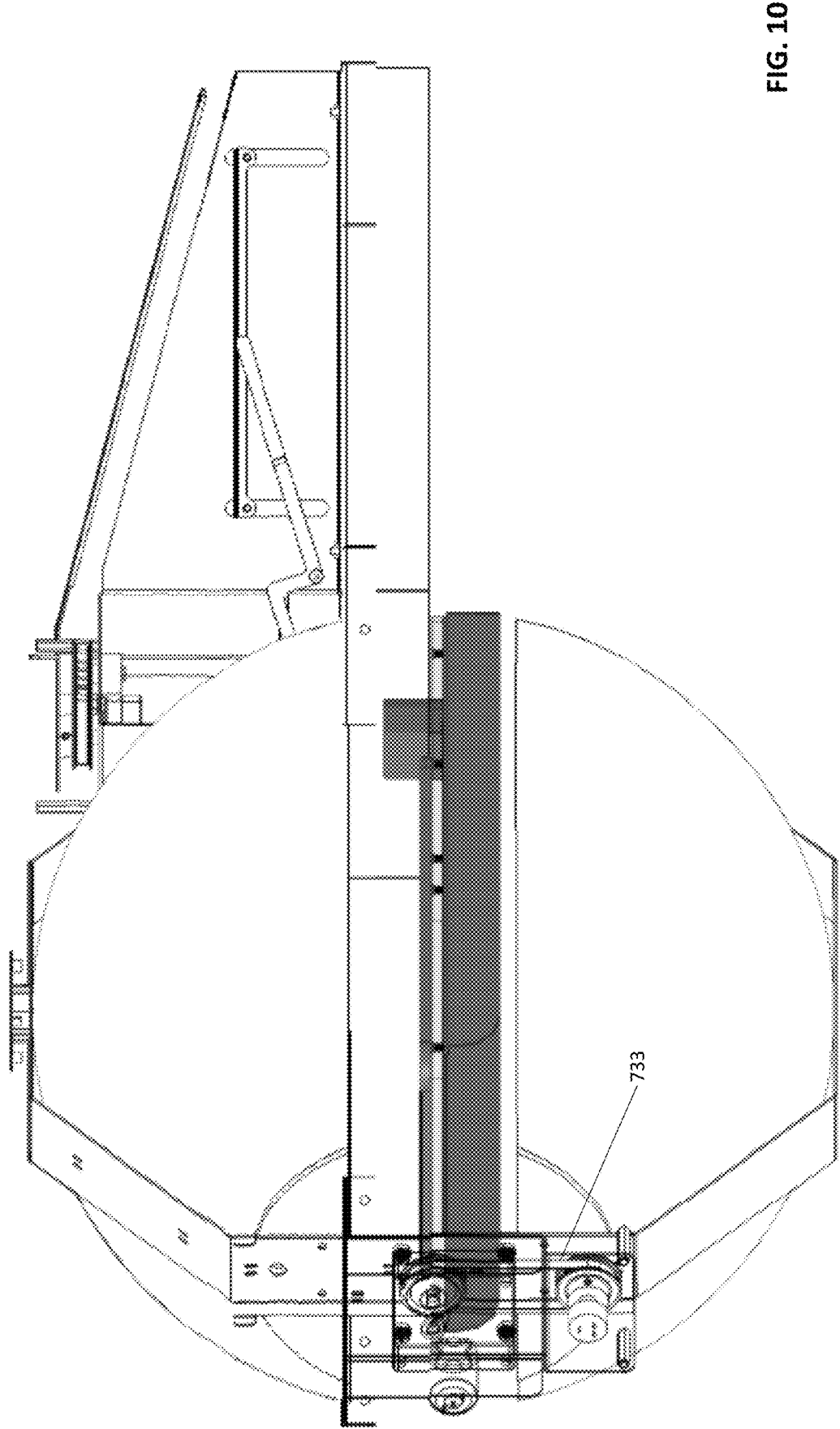

FIG. 10 illustrates the same view as FIG. 9, but with the camera motor 730 and a camera motor holder 732 illustrated in transparent mode so that more details of the camera motor 730 and belt 733 are illustrated.

Figure 11:
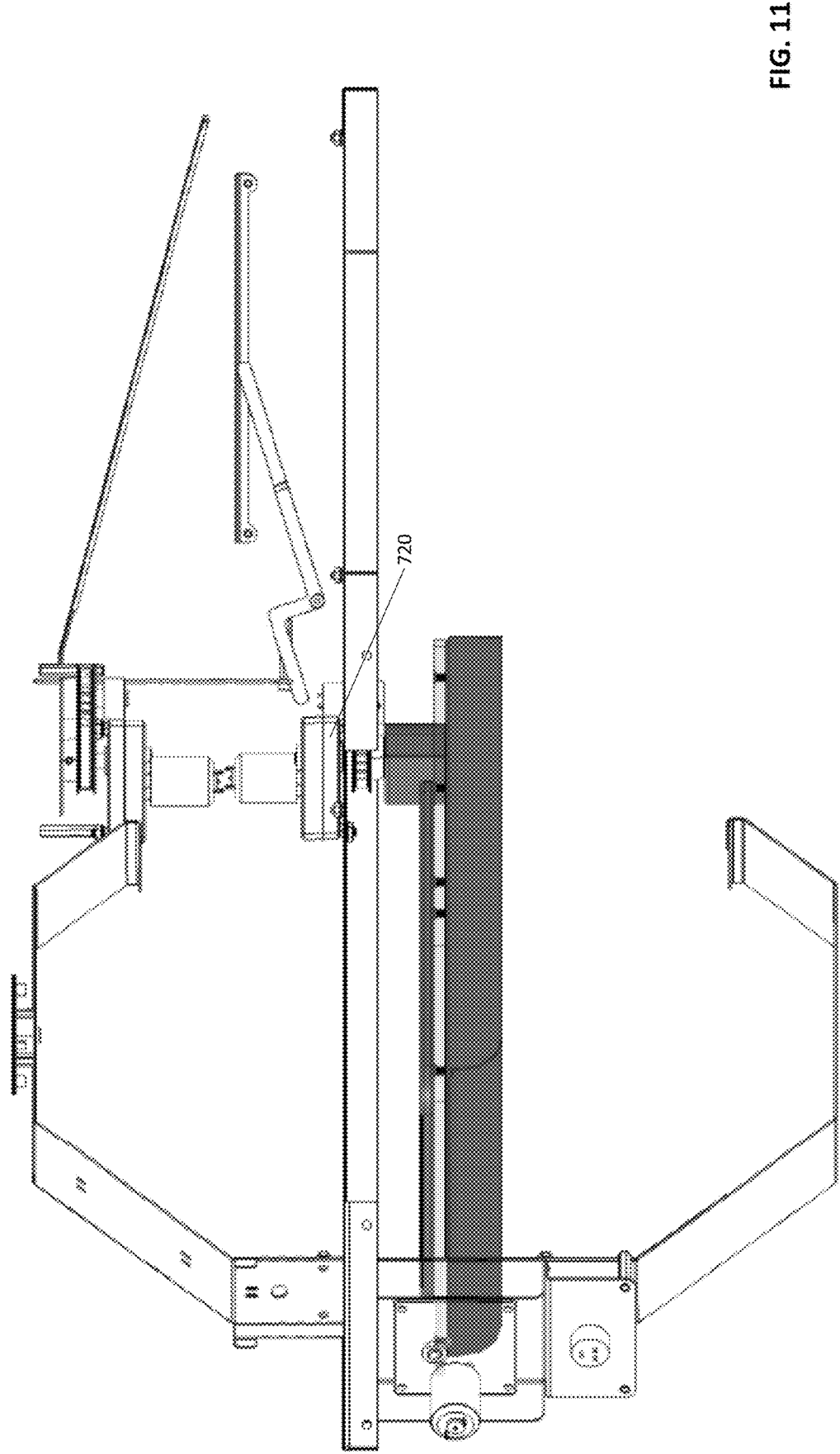

FIG. 11 illustrates yet another wireframe image of the same angle as FIGS. 9-10, but with the domes 704 and 706, and parts of the device entry unit 702 and plateau 710 hidden from view in order to more clearly illustrate certain features such as the shutter actuator 734, and shutter 736, and shaft assembly 720, and motor and belt assembly 722.

Figure 12:
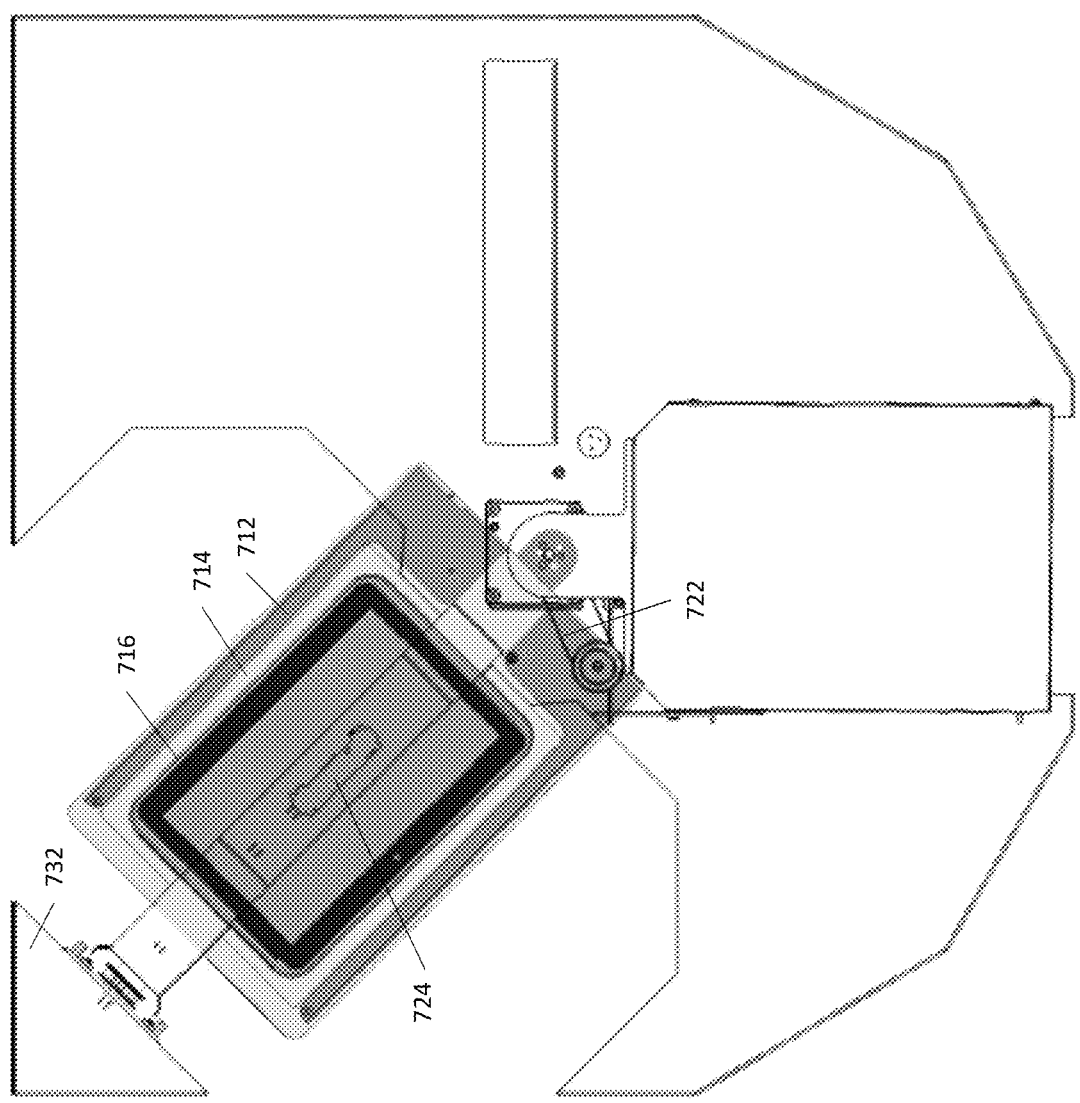

FIG. 12 schematically illustrates a view from the top with certain parts set to be transparent so that a top-side of a device 716 which is resting on the glass 714 is seen. Glass 714 is held by the device holding structure 712.

Figure 13:
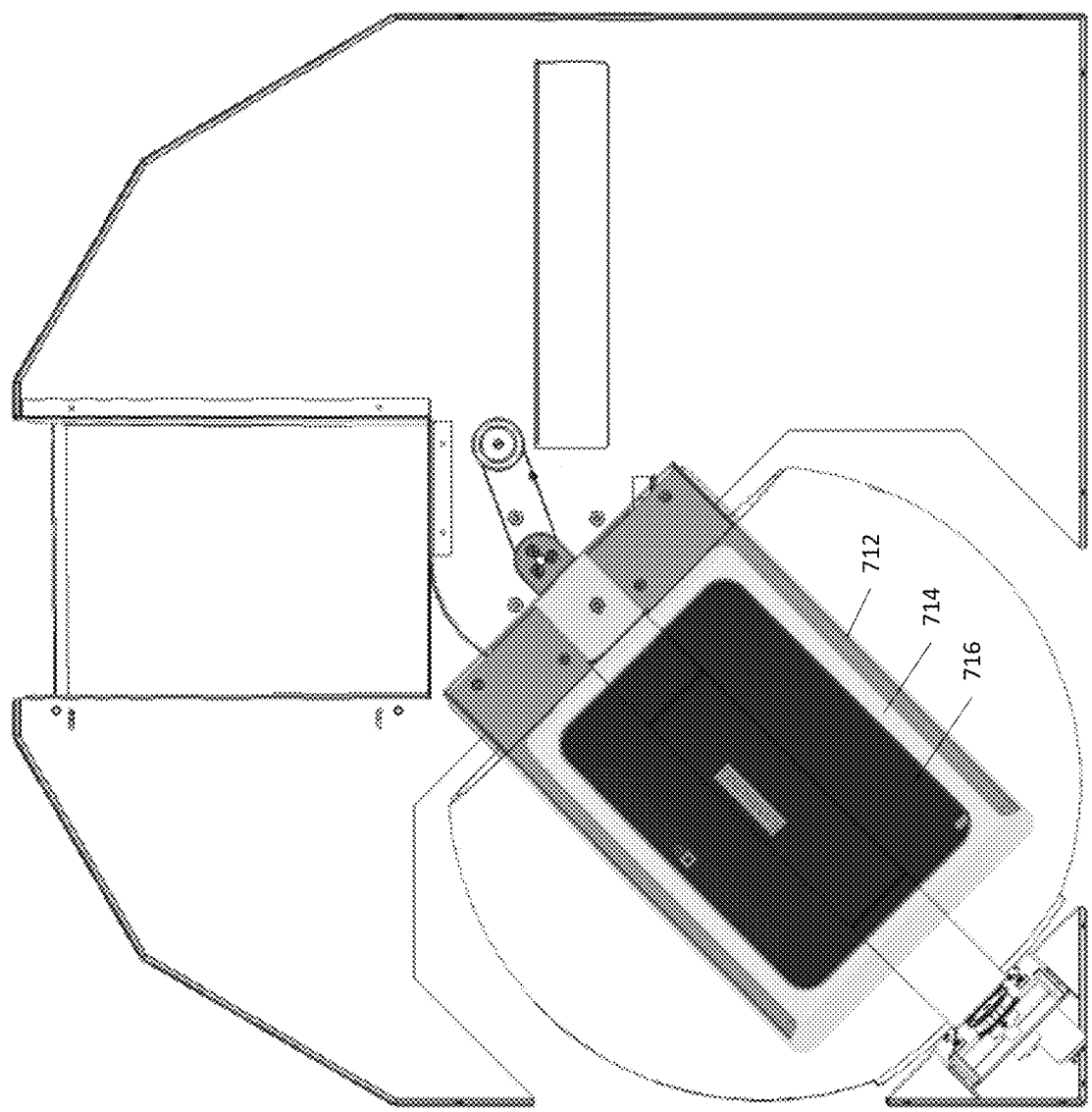

FIG. 13 schematically illustrates a view from the bottom with certain parts set to be transparent so that a bottom-side of a device 716 which is resting on the glass 714 is seen.

FIG. 14 schematically illustrates the two half domes 704 and 706 with the camera arm 726 and camera 724 in place, according to an embodiment.

Figure 15A:
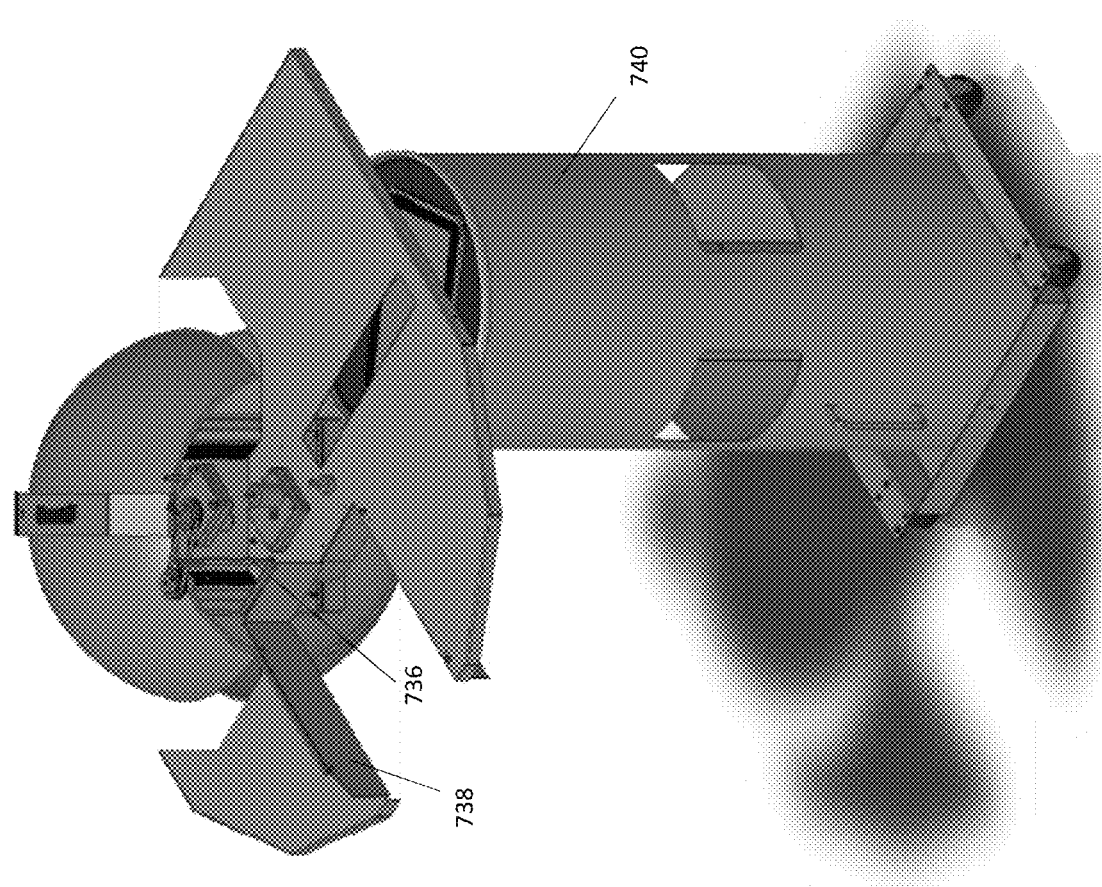
Figure 15B:
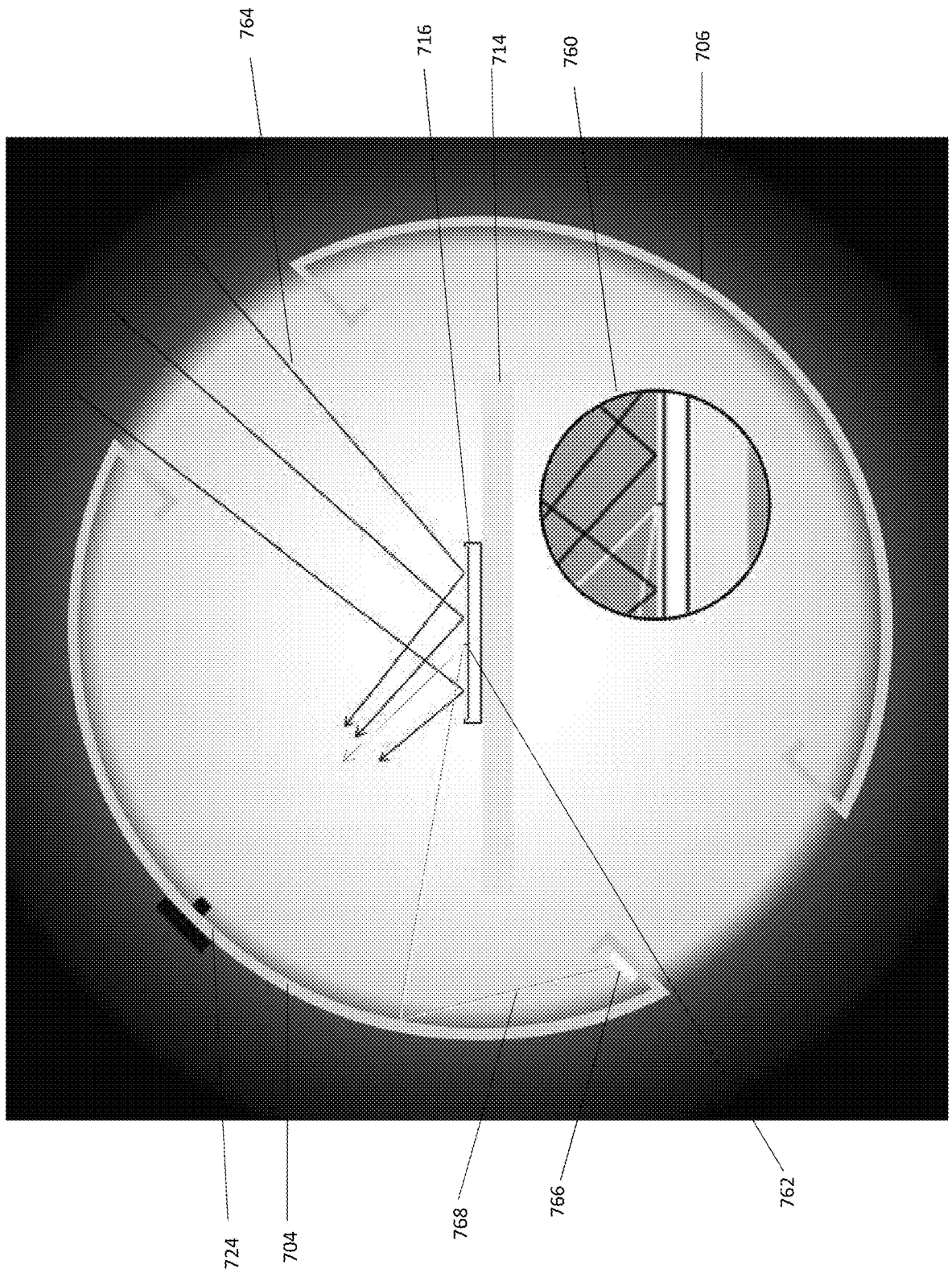

FIG. 15A schematically illustrates a shutter 738 together with shutter actuator 736 (shutter actuator lever 734 is hidden from view by shutter 738), according to an embodiment. In some embodiments, the shutter 738 may be actuated open by the closing of the door 708 and closed by the opening of the door 708. Also illustrated in FIG. 15A is a drum assembly 740 used for collecting the scanned trade devices.

FIG. 15B schematically illustrates using camera 724 at a rotated (e.g., by 45 degrees) position in capturing images of the trade device 716 which is located on the glass 714 within the camera chamber defined by domes 704 and 706, in a manner facilitating the detection of cracks, such as crack 762, on the screen of device 716. Since there is no light in the kiosk, light rays 764 coming from outside the domes are very dim. The light rays 768 coming from the light source 766 inside the domes are very bright in contrast. When the device glass 716 is unbroken and flat, most of the light rays hitting the camera come from outside the domes. If a crack is present on the glass 762, this creates an edge perpendicular to the glass surface which reflects light rays coming from inside the domes into the camera. The resulting image highlights cracks while keeping the rest of the glass surface dark. The software then analyzes the image to detect white lines which represents cracks in the device glass.

Figure 16:
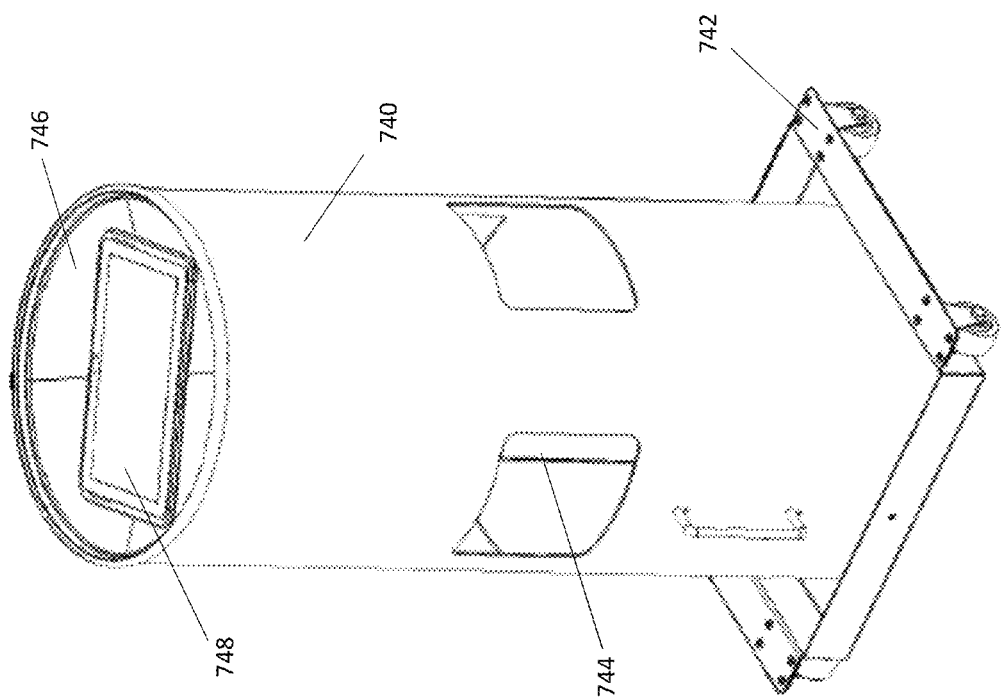

FIG. 16 schematically illustrates the drum assembly 740 which is used to collect the electronic devices that are accepted by the kiosk. The drum 740 may rest on a wheeled dolly 742. A device tray 746 and a tray sleeve 744 are inside the drum to collect the accepted electronic devices, such as shown electronic device 748.

Figure 17:
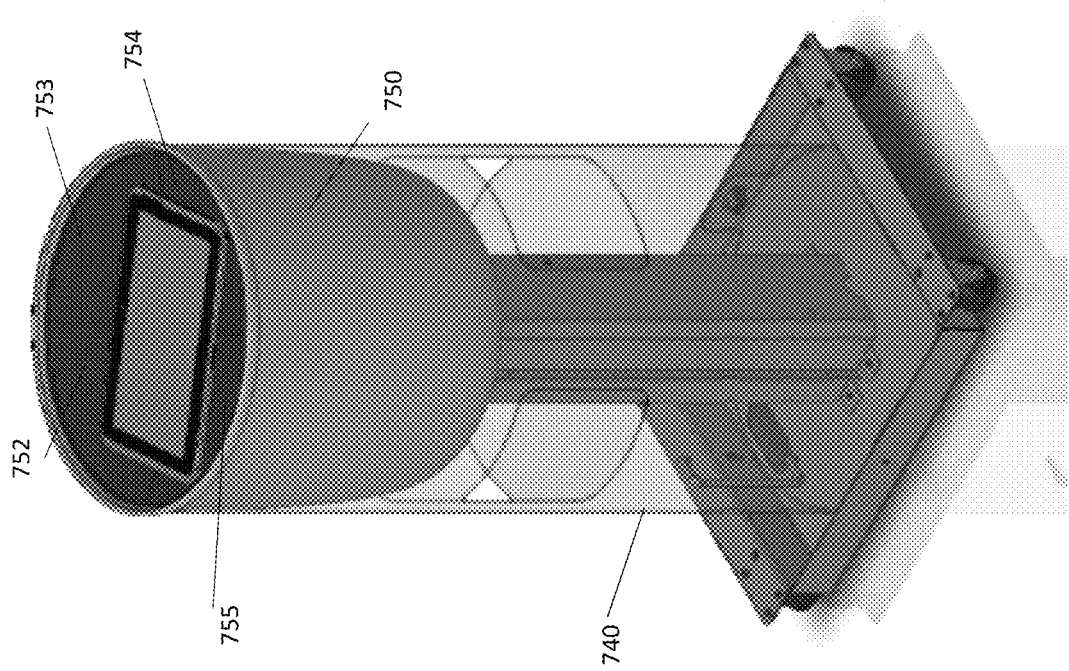
Figure 18:
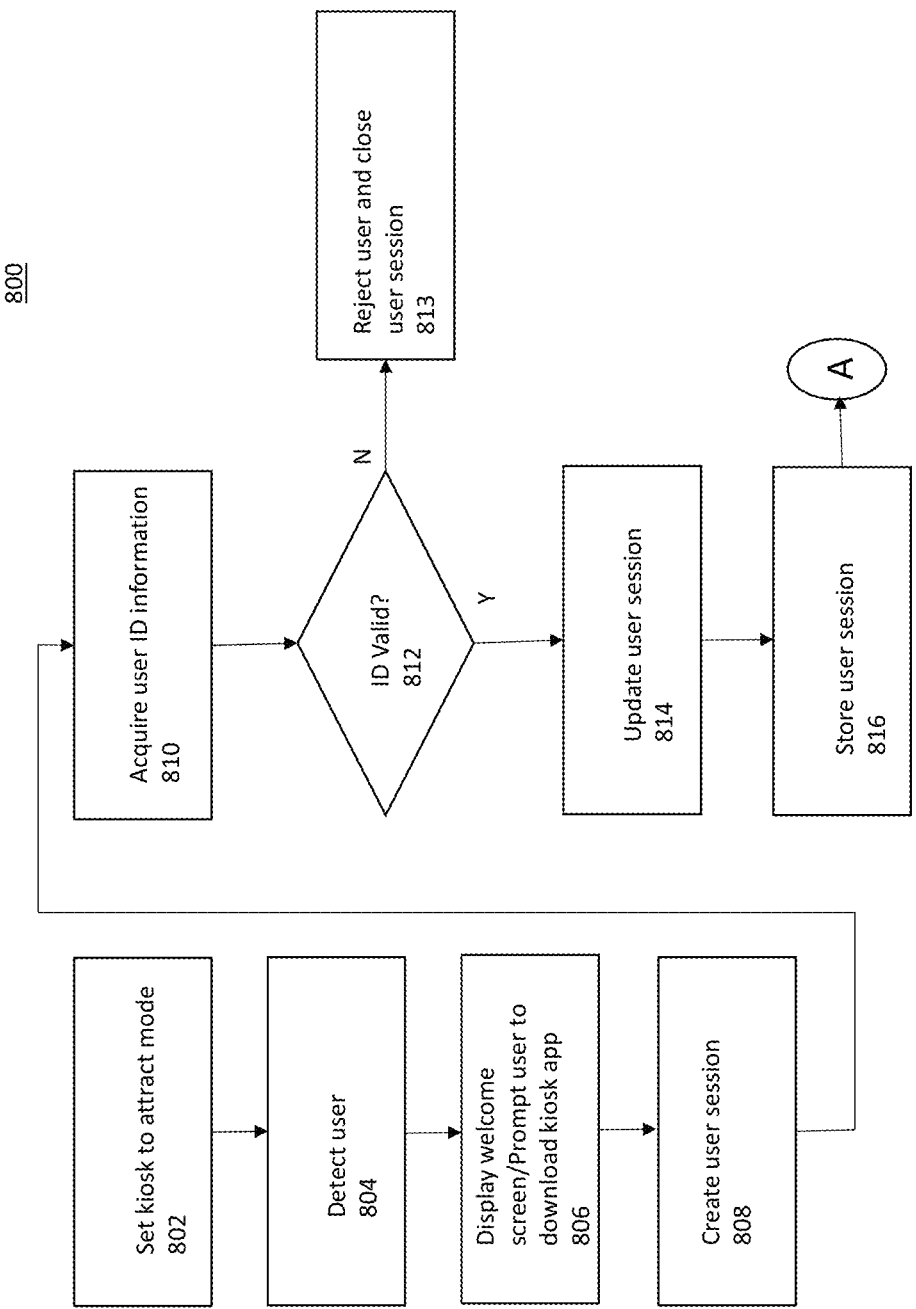
FIGS. 18-30 illustrate flowcharts of processes facilitating the operation of one or more electronic device collection booths according to some embodiments.

FIG. 17 provides a schematic illustration of the drum assembly with outer shell of the drum 740 being transparently illustrated so that the device bag 750 and the multiple device trays 752, 753, 754 and 755 which are linked as one unit can be clearly seen. As devices are dropped onto the tray 746, a motor (not shown) at the bottom of the drum 740 is actuated which drives a mechanism (e.g., an endless screw) that lowers the tray 746. The motor stops when a sensor at the top of the drum 740 detects that the tray has been lowered enough for the device resting on it to clear the top of the drum. In some embodiments, instead of, or in addition to, the sensor, the tray will be moved only for certain predetermined distances or angles based, for example, on commands sent to the actuator or motor controller, or by sending a certain amount of power for a determined amount of time. When the tray reaches the bottom of the drum, a service call is issued to let the kiosk operator know the drum is full and needs to be emptied. The service technician rolls out the drum and pulls out the bag 750 containing the devices FIGS. 18-30 illustrate flowcharts of a process facilitating the operation of one or more electronic device collection booths according to some embodiments.

Process 800 may be implemented by one or more kiosks, such as kiosk 102, as shown in FIG. 1. At operation 802, the kiosk operates in a mode to attract clients, which may be its default mode of operation. For example, the kiosk may display, in a continuously repeating loop, one or more video messages on its screen for attracting clients. During operation 802 while displaying imagery for attracting clients, the kiosk may monitor one or more inputs to detect the presence of a client. In some embodiments, the kiosk may include one or more motion sensors that enables it to save power and/or idle when no potential client is detected nearby based upon motion. In some embodiments, the attract loop may also include predetermined audio being played through one or more speakers of the kiosk. The video and/or audio of the attract loop may include advertisements or other programming, and may be, at least in part, provided by a remote server (e.g., a central remote server providing programming to the network of kiosks) and/or local operator. For example, in some embodiments, the attract loop of a particular kiosk may include advertisements relevant to the local establishment in which the kiosk is located, and may have been provided either by a remote server or the operator of the local establishment.

At operation 804, a client is detected. The detection may be based upon detecting that a human is facing the kiosk at a close distance (e.g., 1-2 feet) away from the kiosk. This detection of presence may be based upon one of the cameras illustrated in kiosk 302 shown in FIG. 3, or a separate motion sensor. The detection may alternatively, or in addition to the above, be based upon a touch input, voice input or button press received on the kiosk. In some embodiments, based upon a motion detected by a motion sensor, the kiosk may begin the welcome screen display and request the client to touch a virtual button displayed on the screen.

After the presence of a client is detected, at operation 806, a welcome screen is displayed. The welcome screen may include information prompting the client to download a kiosk application. The welcome screen may comprise one or more screens and/or displayed images and/or messages. In some embodiments, messages can also be transmitted as audio, perhaps synchronized to the video messaging being displayed. The welcome screen may also prompt the client to provide identifying information.

At operation 808, a user session is created in the kiosk. The user session is intended to capture sufficient information to record the entire transaction for purposes including, for example, legal/contractual purposes, record keeping purposes and data collection purposes.

At operation 810, an ID card provided by the client is detected. For example, the client may have inserted a driver's license (or other similar ID card) into the ID card unit 311. The ID card is scanned and/or photographed on one or both sides in order acquire the client's ID information. In some embodiments, the ID card may be recognized and its information extracted by analyzing one or more photographs of the ID card acquired by an outside facing camera (e.g., without requiring insertion to a ID card unit).

At operation 812 it is determined whether the submitted ID is valid. In some embodiments, the scanned/photographed ID card information may be transmitted to a call center agent who verifies the information and communicates approval or disapproval. In other embodiments, at this stage, if certain basic predetermined parameters are satisfied for the scanned/photographed ID card, the ID may be assumed valid. For example, if the provided ID card is a driver's license, the kiosk may determine, by running optical character recognition or the like upon the scanned/photographed ID card, a driver's license number and name, and that information may be communicated to an internet resource that can verify the authenticity of the ID card information.

According to some embodiments, the ID card scanning system is built to reduce costs when compared to commercially available ID card scanning systems. In one embodiment, the ID card scanner includes a simplex business card scanner that drops the ID card into a chute after it passes through the scanner in one direction. This makes the mechanical process significantly simpler and more resistant to failure by removing the need to reverse the motors to get the card back out of the scanner.

Once the card is scanned, both top and bottom pictures may be sent to an OCR server. Through the use of APIs (e.g., Google Tesseract and Inlite ClearImage), the server finds and decodes barcodes that may be present in the ID card or in the pictures and uses OCR to read any text. Thereafter, a check is made regarding whether the OCR data matches the data found in the barcodes. This helps automatically assess if the card is valid.

Any pertinent information ascertained by this ID card unit may be then sent to the kiosk to possibly be used during the rest of the transaction. For example, if the client's name is extracted by the ID card unit, the kiosk may continue to communicate with the client by using their name. In some embodiments, the kiosk's graphical user interface (GUI) may also use a speaking avatar and the avatar may also "speak" to the client by the name as determined by the ID card unit. The date of birth, age, or address/state information that may be obtained from the ID card may be used to further customize the avatar and/or questions asked from the client. Such information can also be used to customize the payment to be offered for a trade device. For example, age and/or address may be used in selecting among several types of coupons that may be offered in payment for a trade device.

In order to increase the likelihood of successfully completing a transaction and because customers generally respond favorably to a more personalized transaction, in some embodiments, the kiosk may use a speaking avatar to help the client throughout the transaction. The avatar may be configured such that, initially it "speaks" to the client in general terms using pre-authored audio/video files. As the transaction progresses with the client, and as the system learns more about the client and the device intended to be traded, the system may select parts from many different pre-recorded audio/video files, concatenate them (e.g., audio and video may be concatenated separately), and then it mix the audio and video files to be able to play one seamless file that "speaks" to the client in more personal terms. This makes it such that for each transaction, the avatar is modified in its speech as well as in its appearance and gestures such that every transaction becomes uniquely personal.

The kiosk contains a plurality of pre-recorded files audio files. Each of these audio files may contain small snippets of phrases that have been professionally mastered, in studio, using live voice artists. Each of these audio tracks may have been engineered using certain ambient sounds, pitch modifications and other studio techniques. The selection and concatenation of the separate audio files are performed such that the concatenated file represents an audio played in one uninterrupted take, e.g., it sounds as if the whole audio file was originally recorded in one take.

The pre-stored video files each contains a small snippet of character animation rendering of an avatar's movements (e.g., body and/or face). The videos may be professionally animated. Each of these renderings start at one of a plurality of "base frames" and end at one of a plurality of "final frames". For each animation, a plurality of these video files may be concatenated in order to form an animated avatar suitable (e.g., determined based upon predetermined settings) in the appearance, in consideration of one or more of the particular client, device to be traded, time of day, location, environment etc.

To gather data that can then be used in the personalization of the avatar, certain information may be collected. The kiosk location may be determined from an internal GPS in the kiosk and/or Internet connection, and that location information can be used to determine further aspects such as: the state and city names, the location name (e.g., shopping mall, store, school etc.), the current local weather and temperature, the local weather forecast, identity of home sports team as well as latest scores, current local traffic conditions. Software can be used to determine gender, age, race, facial features, height etc. from the video streams and/or images captured from any of the camera of the kiosk. Information that can be collected directly (e.g., name, age address, etc.,) from the client or the presented ID card, information regarding the device the client intends to trade, and any other information obtained from the client, with or without the aid of the kiosk app, can also be useful in personalizing the avatar.

Since image recognition is a CPU intensive process, having this process on a central server gives the opportunity to increase performance by customizing the hardware. In contrast to many commercially available systems run their API on the client machine, some embodiments use a low power CPU which is not optimized for that kind of workload.

Additionally, specialized hardware and/or software at the processing server remotely located from the kiosk can also use facial detection/analytics software to help detect more information of the pictures taken of the client at the kiosk, such as their age, gender and height. With this, the processing server can inform the call center agent if the software has passed certain thresholds of certainty of a match.

Once the client is identified, the system can use that information to modify the kiosk's behavior perceived by the client, by personalizing the transaction, thus increasing the odds of success while also increasing the security of the transaction. For example, the avatar can be made to speak to the client using the client's name (by either using prerecorded audio files or, commercially available text-to-speech software), and/or the avatar's speech may be personalized to the client by using more age-targeted phrases. Additionally, whereas, for security reasons, the number of transactions may be restricted to a certain number for a client initially, that number may be increased over time and instances of use by that client.

If the ID information is not valid, then the client may be rejected and the user session closed at operation 813.

If the ID information is found to be valid, at operation 814, the user session is updated to include the client's identification information. At this stage, the user session may be maintained in memory.

At operation 816, the updated user session is stored. The storing may be to non-volatile memory in the kiosk. In some embodiments, the storing may also be to a remotely located storage server.

Figure 19:
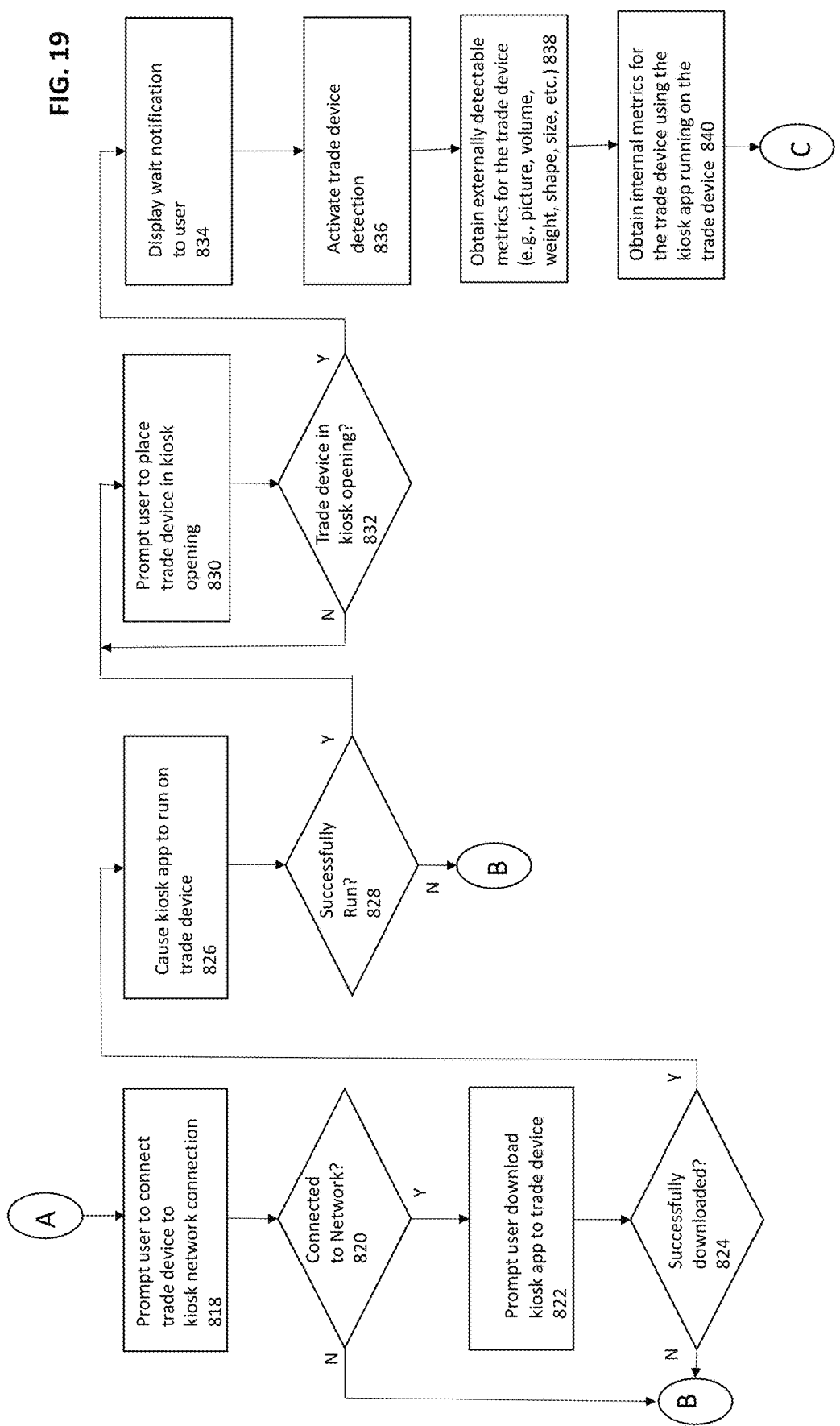

FIG. 19 illustrates a portion of flowchart 800 including operations 818 to 840. After operation 816, the flowchart 800 proceeds to operation 818. At operation 818 the client is prompted to connect the trade device (i.e., the electronic device that the client intends to trade or submit for analysis by the kiosk) to the kiosk network connection. According to an embodiment, at least one of the options available to the trade device for connecting is a wireless network connection which includes, for example, a WiFi or Bluetooth connection. The prompting may be performed using a displayed message and/or audio prompts requesting that the client connect the trade device to the kiosk client network. In some embodiments, the connection between the trade device and the kiosk may be made using another form of near field communication (NFC) protocol.

At operation 820, it is determined whether the trade device is newly connected to the kiosk client network connection. The detection may be performed by a router in the kiosk and/or a control processor of the kiosk. The detection may be based upon monitoring new connections at the router and/or based upon a required sign-in operation to the router.

If the trade device is connected to the kiosk client network, then at operation 822, the client is prompted to download the kiosk application ("kiosk app") to the trade device. The prompting may be based upon displaying a message on the screen of the kiosk. This prompt may be customized to the device type detected while the connection was established.

At operation 824, it is determined whether the kiosk app was successfully downloaded to the trade device. This determination may be based upon an amount of data transferred via the router to the trade device. In some embodiments, this determination may be made through the use of a proxy on the router that tunnels and monitors connections to known hosts. In some embodiments, this determination may be made when the kiosk app is automatically installed on the trade device and communicates with the kiosk.

At operation 826, the kiosk app is caused to run on the trade device. For example, upon completion of the download, the kiosk app may be configured to automatically install and run on the trade device. In some embodiments, the client is prompted to install and run the kiosk app.

At operation 828 it is determined whether the kiosk app successfully executed on the trade device. This determination may be based upon the kiosk receiving a preprogrammed message from the kiosk app now running on the trade device.

If the kiosk app was executed successfully, at operation 830, the client is prompted to place the trade device in the kiosk for evaluation. This prompting may be delivered via the kiosk's screen and/or the trade device's screen.

At operation 832, it is determined whether the trade device is in the kiosk opening. This determination may be based upon a sensor in the opening and/or camera view of the opening. In some embodiments, the door to the opening is electronically controlled to open when the message prompting the client to deposit the trade device is displayed. The amount by which the door is opened may be controlled in accordance with the type of trade device being deposited, for example, in a manner that just enough space is provided in the opening to deposit the trade device in a horizontal orientation. In some other embodiments, the door is manually opened by the client.

If the trade device is detected in the kiosk opening, then at operation 834, a message is displayed to the client to indicate that the trade device is now being evaluated. At operation 836, trade device evaluation is activated.

In certain example embodiments, the kiosk app is used to relay information about the device to the kiosk and/or to the call center, to display instructions to the client and also as a security measure. The app and the kiosk operate in tandem to make available an extensive test of each user device. Whereas some online and "brick & mortar" companies that accept used electronic devices in exchange for money, pay only after they get the phone into their hands (therefore adjusting the price once they physically test all features and see the phone's condition), in the example embodiments discussed herein, the service provider (e.g. entity purchasing the trade device) would desire to be as certain of the value of the device as possible because payment for the device is made to the client at the kiosk before the provider or any of its human operators physically receive it.

When a client is at the kiosk, after they have identified themselves (e.g., via their picture and that of their official ID card) the kiosk may open its WiFi hotspot capability (to discourage abuse, at least in some embodiments, WiFi may only be available for a short time and only points to the kiosk app on the OS's Application Store). The client may then, if they had previously already downloaded the kiosk app on to the trade device, be prompted to run the kiosk app. The app, after it is started, will connect to the kiosk and the client will be instructed to follow directions provided on the screen of the trade device and/or on the kiosk.

If the client has not yet downloaded the kiosk app, the system will guide the client (e.g., through the kiosk's GUI) on how to download the app and subsequently the client will be instructed to start the app and to follow directions.

When the kiosk app is started on the trade device, it may verify that the trade device is connected to the kiosk's WiFi. If the trade device is not already connected, the GUI (on the app and/or on the kiosk) instructs the client to connect to the kiosk's WiFi (e.g., "Buy Back Booth's Wi-Fi").

Once connected, the application collects the trade device's information (e.g., IMEI/MEID/ESN (if possible), brand, model #, carrier, CPU, RAM, SD card, etc.) and detects any peripheral that is attached to the trade device either directly (e.g., earphones, battery pack, charging cable, adapters etc.) or wirelessly (e.g., watch, headset, phone, thermometer, etc.). It gathers all this info and transfers it to the kiosk. It then waits for further instructions.

Instructions on the kiosk screen may be displayed on the kiosk application at the same time, for example, to put the trade device into the kiosk or if an accessory attached to the trade device is detected that needs to be removed (e.g., plastic cover).

A kiosk where the trade device (e.g., phone) has to be inside the kiosk to test it may have to request the client to remove the phone from the kiosk to do certain operations (e.g., a message such as "Sorry, you seem to have forgotten to remove the earphones and auxiliary battery pack as well as the charging cable. Please take the phone out of the kiosk and remove them."). Also, since there is no convenient way to tell if the client has indeed removed all of the attachments (e.g., while the phone is in the user's hands, outside of the kiosk), this may still go on a few times as the client may have only completed some of the requests. With the kiosk app that is wirelessly linked to the kiosk, the client is asked to fully prepare the phone before ever inserting it into the kiosk so as to avoid the need to have the client insert and remove the trade device from the kiosk several times.

While the client is still handling their trade device, the kiosk app may (in some embodiments, under the control of the kiosk and/or call center) also have the client test the physical buttons of the trade device (as a broken button significantly reduces a trade device's value). Both the kiosk app and the kiosk will instruct the client to press on the volume, home and on/off buttons (e.g., and other buttons specific to each model phone—since the kiosk app will have informed the kiosk or call center operator of the model). While this is going on, the kiosk or call center operator can (transparently to the client) have the kiosk app test things like, the accelerometer, the gyroscope, the GPS, Bluetooth, etc. Only when either the app has run through a standard predetermined test routine and/or the kiosk or call center operator has been satisfied that the trade device is ready to be placed within the kiosk will the client be permitted to place it in the kiosk opening for further evaluation.

Once the phone is in the kiosk, the app and the kiosk still work in tandem to continue the testing. For example, the app will force the phone to take pictures with one or both cameras (albeit within the kiosk) and transmit these to the server and have them available to the call center operator for evaluation. The kiosk may be configured with one or more particular markings for the purpose of being analyzed for quality when the markings are detected in images captured by the trade device's camera(s).

Once the trade device is in the kiosk and the door is closed, the kiosk may send a unique identifier to the trade device which then displays it as a QR code on screen. The kiosk reads back this QR code while taking pictures of the trade device which verifies that the trade device in the kiosk is really the trade device that is running the application. In some embodiments, patterns other than QR codes may be displayed and detected for this purpose. This security measure is important in order to avoid a situation where a client tries to run the application on two devices and put the lower valued one in the kiosk as the trade device.

The kiosk app can also test the trade device's speaker(s) by having the kiosk cue the app to play an audio file while the microphone in the kiosk records it and sends results to the processing server (e.g. processing server 108). The reverse may also be done where the kiosk will play a file through a speaker within the kiosk and cue the kiosk app to record it and send the results to the server or to the kiosk app. The server or the kiosk app may be configured to detect the known audio files and alert the agent if either the microphone or the speaker of the trade device is damaged. The kiosk app or other program residing in the kiosk can also be used to test for dead pixels by displaying full solid black, white and/or colored images and using the kiosks camera(s) to take pictures of the screens to then send to the server for further review. In some embodiments, the program executed on the trade device may be initiated by accessing a web page from the trade device.

Network connections can also be tested by communication between the kiosk app running on the device and the kiosk. For example, signal strength for WiFi, cellular, Bluetooth etc., can be measured and compared against known or predetermined values at the kiosk. The kiosk may be equipped with a one or more Bluetooth and/or other near field communication-enabled trade devices that can pair with the client's device, thereby providing a means for testing such functionality.

Application commands can also be used to control the trade device remotely. This gives the kiosk or the call center operator the capability of retrieving more information or display specific things on screen. For example, the call center operator may have more comprehensive tests for each particular feature. Say, for example, the call center operator needs more pictures of the trade device taken at different angles while the trade device's screen is displaying different images: it would be possible for the operator to instruct one or both the app and the kiosk to do so.

If the IMEI cannot be retrieved programmatically by the kiosk app, the kiosk app may use a corporate installation certificate that the client needs to approve which gives access to the IMEI. This feature may be used as a means for enterprises to identify and automatically install updates and applications on their fleets of mobile devices. Some or all of the analysis and detection of the audio quality can be performed at the kiosk. Some or all of the analysis and detection may be performed entirely under the control of the kiosk and/or the call center operator.

At operation 838, externally detectable metrics for the trade device (e.g., picture, volume, weight, shape, size, etc.) are obtained. The trade device is moved into a scanning chamber in the kiosk for the evaluation. One or more cameras may be utilized to capture images of the trade device. The images may be for determining the externally visible characteristics of the trade device. For example, visible indications of the type and model of the trade device, cracks, dents, scratches, etc. on the surface, missing buttons, etc. The kiosk may, in some embodiments, automatically determine, based upon images captured by a plurality of cameras, a volume, size and/or shape of the trade device. In some embodiments, a weighing scale may be integrated into a platform which holds the trade device when it is within the scanning chamber, or before it is in the scanning chamber, that can detect the weight of the trade device.

At operation 840, internal metrics for the trade device are obtained using the kiosk app running on the trade device. Internal metrics may include operating system, memory, manufacturer, model number, hardware features and configuration, battery status, network status, signal strength, audio quality, video display quality, etc.

Some embodiment are configured to one or more techniques for identifying the trade device. According to an embodiment, a first technique of identifying a device is also used to continuously upgrade the success rate of a second technique for identifying devices. The criteria to decide which technique to use may, in some embodiments, solely be based on whether a trade device can run the kiosk app or not.

If the trade device can run the kiosk app, the app may be programmed to cause the trade device to transfer all the information needed to identify itself to the system's servers. In some embodiments, the information can be deemed 100% accurate. The kiosk takes pictures of the trade device to match the information decrypted from the QR code shown on screen against the information received directly from the trade device. All pictures and data may be sent to the call center where an operator can assess the information received and condition of the trade device (scratches, missing button, etc.). The pictures obtained this way are deemed to be accurate ones of the positively identified device so they can be used to further populate one or more central databases.

If the trade device cannot run the application (because it's not a smartphone or a compatible processor based device, it's broken, etc.) the client is instructed to put the trade device in the kiosk as is. The kiosk takes pictures of the trade device and sends those pictures to the call center or processing server. Once on the call center, the pictures are run through an algorithm which detects features of the device (device surface area, screen surface area, width/height ratio, color, button placement, edge features, markings). These values are then compared to pictures stored in a database to match possible candidates. The top candidates (e.g., top five candidates)—with maybe a percentage of certainty—are shown to the call center agent who then selects the correct one.

Figure 20:
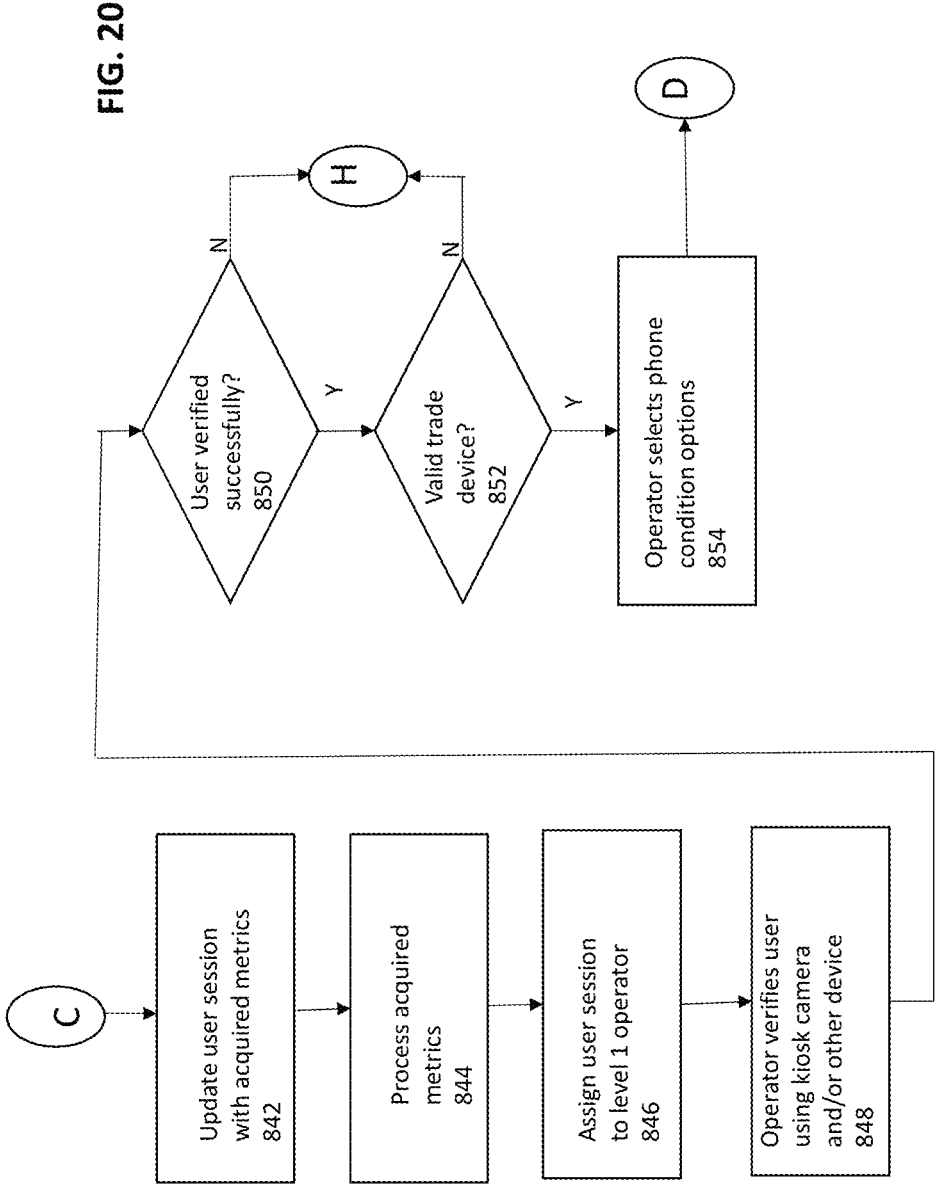

FIG. 20 illustrates a portion of flowchart 800 including operations 842 to 856. After operation 840, the flowchart 800 proceeds to operation 842. At operation 842, the user session is updated to include aspects of the collected metrics.

At operation 844, the acquired metrics are processed. The processing may include performing validity checks on some of the collected metrics. Processing may also include deriving one or more parameters based upon obtained parameters. For example, a remaining battery lifetime may be determined based upon the collected metrics of battery strength, battery type, and the type and model of the trade device.

At operation 846, the user session is assigned to a remote operator (e.g. a call center operator). According to an embodiment, where multiple levels of remote operators are available to service clients at kiosks, a level 1 remote operator is assigned to the user session based upon the specific criteria of this user session.

At operation 848, the remote operator verifies the client. Verifying the client may be based on the obtained information (e.g., ID card information) and images of the client as captured by one or more of the kiosk cameras. For example, the remote operator may compare the image in the driver's license to the image captured by the camera in order to determine whether they match. If it is determined that they match, the remote operator determines whether the client is indeed the same person as the one identified by the card inserted.

According to some embodiments, the Call Center Agent may be a final decision maker for each and every transaction. In general, there are several factors that may be used in the call center operator's decision for the satisfactory completion of a transaction.

In some embodiments, the call center operator may have to be satisfied that the pictures taken of the client matches the picture(s) on the client's official ID Card, so that, for example, a reliable positive identification can be made. If the call center operator feels more pictures are needed, he/she can command the kiosk to acquire more pictures. In some embodiments, the call center operator may command the kiosk to acquire pictures using specified capture parameters (e.g., capture angle, zoom level, light level, etc.). The captured pictures may be transferred immediately after capture to the requesting call center operator.

The call center operator can also send text messages or other signals to the kiosk's GUI commanding the GUI to display messages requesting the client to remove sunglasses, hats, scarfs, etc., or to stand and/or face in a particular manner (e.g., directly face camera, tilt face up, look to your left etc.) before the next image is taken.

The call center operator may also have to be satisfied that he can accurately identify the device submitted by the client at the kiosk, albeit with all the help that a database can offer him.

The call center operator may also have to be satisfied that the money offered to the client for their device is in line with all the rest of the information gathered up to that point—including the general condition of the device submitted.

The call center operator can also affect the progress of the transaction by sending the trade device back to the client and opening the door and asking the client to turn over the device (as it may have been placed incorrectly) or even just terminating the transaction while sending the client a message for this decision.

At operation 850, it is determined whether the client was successfully verified.

At operation 852, it is determined whether the trade device is valid. The call center operator may make this determination based upon all the metrics and other information gathered so far regarding the trade device from the scanning and from running the kiosk app.

Figure 21:
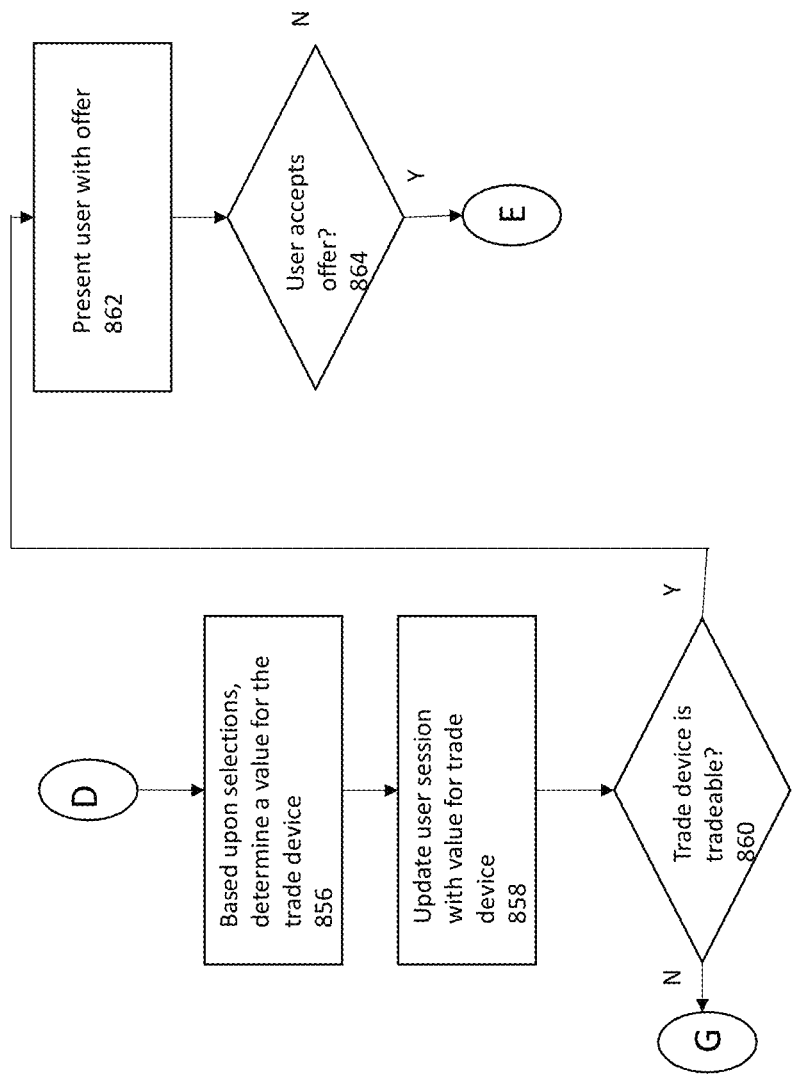

At operation 854, the operator selects trade device conditions. The call center operator may be presented with various visual condition options. For example: cracked screen, blemishes, scratches, missing buttons, missing back cover, missing battery. The operator may also be presented with a general condition selector (i.e.: bad, poor, good, excellent, etc.) which will directly impact price. At this point, the operator may choose to decline the trade device condition, for example, due to unwanted attached options (i.e.: earphones, cables, non-genuine cover, etc.) FIG. 21 illustrates a portion of flowchart 800 including operations 856 to 864. After operation 854, the flowchart 800 proceeds to operation 856. At operation 856, a value for the trade device is determined based upon the information gathered and the conditions selected previously.

At operation 858, the user session is updated with the estimated value for the trade device.

At operation 860, it is determined whether the trade device is tradeable. For example, if the estimated value for the trade device is above a predetermined threshold, then it is considered tradeable. Otherwise, it is untradeable. An example predetermined threshold value may be $0.

If the trade device is determined to be tradeable, at operation 862, the client is presented with an offer for the trade device. The offer may include a price that the kiosk operator is willing to pay the client for the trade device. The price may be the same as the estimated value or may be based upon it. The offer may be presented by displaying the price and virtual buttons that the client can use to indicate acceptance or rejection of the offer.

Some business model for operating the kiosks, like the kiosks described here, call for the same company to own, distribute and service each kiosk directly. This model is prone to being very taxing to the company's finances as well as to their human resources.

In some embodiments, each kiosk 102 (or, in some cased, each group of kiosks) is sold to an independent business owner (IBO) who will then "subscribe" to services of a first company. The goal may be to offer flexibility and/or encourage geo-specific pricing. In order to achieve this model of operation, a plurality of different "subscription packages" can be offered. The IBO may start by purchasing (or in some occasions leasing) the package that consists of the kiosk with all of the software to operate the kiosk. It is understood that the kiosk is made to work while connected to a centralized call center operators and processing servers. Some examples of flexible subscription models include a basic model, geo-specific pricing model, or a combo pricing technique.

According to the basic pricing model, the IBO purchases the kiosk as well as the software that runs it (including the call center operators, etc.). What the user is paid for a traded device is determined based on factors such as the trade device's current wholesale value, the projected retail value, the amount of inventory currently or expected to be accumulated of that particular device, etc.

According to an example embodiment, the IBO's payment for a traded device is based on a scale that integrates one or more factors which may include the amount paid to the client, the total amount of units received by the IBO in a given time, the overall number of kiosks operated by the IBO, etc.

According to the geo-specific pricing model, the IBO purchases the kiosk as well as the software that runs it (including the call center operators, etc.). The system determines what the client is paid for a particular device based on factors like: the projected price that the trade device will be resold at the amount of inventory accumulating of that particular device, etc. One may also modify the pricing based on the geographic location of the kiosk.

The IBO may keep a small amount from each sale the amounts of which are determined on a scale (based on one or more factors which may include the amount paid for the trade device, the total amount of units received by the IBO in a given time, the overall number of kiosks operated by the IBO, etc.).

According to the combo pricing, the IBO purchases the kiosk as well as the software that runs it (including call center operators, etc.). The system may determine a recommended amount that should be paid for a particular device based on factors like: the amount paid once the device is sold, the accumulated amount of inventory etc. The IBO may be able to modify the amount paid to the client (within a min/max range) based on their own criteria. The trade device collection entity (e.g. first company) may share in the gains or losses—but is likely have a minimum amount that is received in any case. In some embodiments, previous transactions and/or other sources of transaction information may be processed to determine the amount of payment, and/or to determine other transaction information that can be displayed to the client. For example, previous transaction data from various sources can be analyzed to determine the prices paid by competitors for trade devices of similar type and characteristics.

At operation 864, it is determined whether the client has accepted the offer. The client may indicate acceptance of the offer by touching the appropriate virtual button displayed on the screen of the kiosk. If the client intends to decline, he/she may instead touch a different virtual button for declining.

Figure 22:
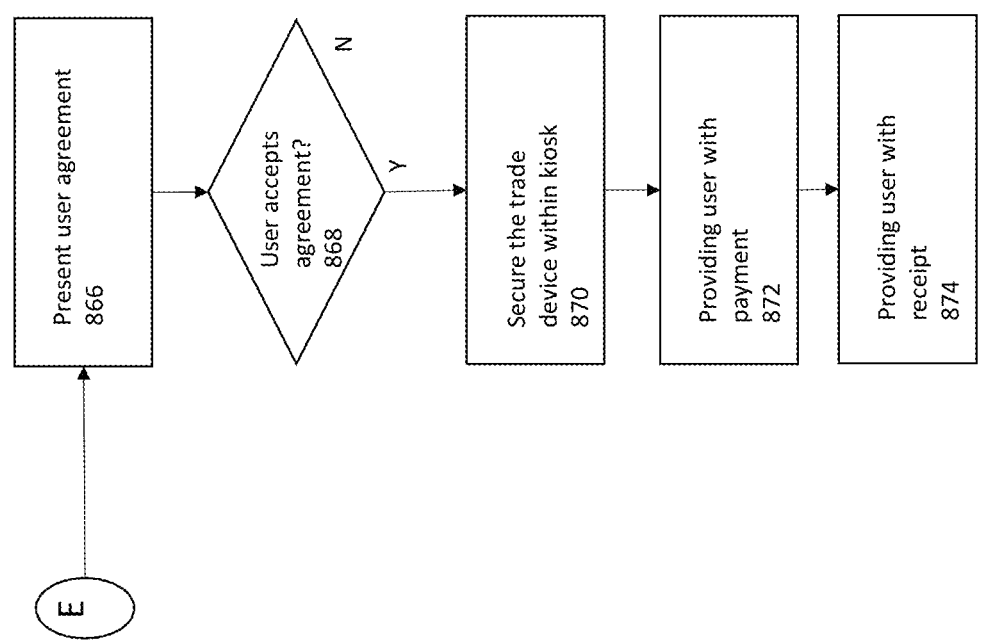

FIG. 22 illustrates a portion of flowchart 800 including operations 866 to 874. After operation 864, the flowchart 800 proceeds to operation 866. At operation 866, the client is presented with the agreement for trading the trade device. The agreement may be a standard form contract with certain fields filled in with information regarding the client's identity and address, the identification of the trade device, and, in some cases, the value for which the trade device is exchanged.

At operation 868, it is determined whether the client accepts the agreement. The client may indicate that he agrees with the agreement by pressing a displayed virtual button. The kiosk app or the server can then generate an agreement ID and associate it with other information gathered in the transaction that uniquely identifies the client.

At operation 870, the trade device is secured within the kiosk. For example, in some embodiments, the trade device will be put in a selected one of a plurality of bins collecting trade devices, in accordance with the type and/or condition of the trade device. In some embodiments, the kiosk may automatically label (e.g. affix a sticker) to the trade device with identifying information before directing the device to a selected bin.

At operation 872, the client is provided with payment. The payment to the client of the agreed upon amount may be provided in cash or other means. For example, Paypal transfer, email wire transfer or other credit may be provided in addition to, or in place of, cash. Coupons, redeemable at the local establishment where the kiosk is located or elsewhere, may be another form of payment dispensed in exchange for a trade device.

At operation 874, the client is provided with a receipt for the trade device. The receipt may indicate identifying information for the trade device, the time and date of the transaction, and the amount paid to the client in exchange for the trade device. In some embodiments, the client can select to receive his receipt by email or other electronic transfer. The receipt may include a coupon which may be in the form of a QR code, bar code, or other recognizable identifiers for a merchant to accept the coupon. In an embodiment of the invention, the IBO can be presented configuration options to configure coupons to be handed out for alternate payment methods, including, for example, a coupon to be handed out when a trade device has little or no value. The server may also send to kiosks or groups of kiosks instructions for distributing coupons by the kiosk.

Figure 23:
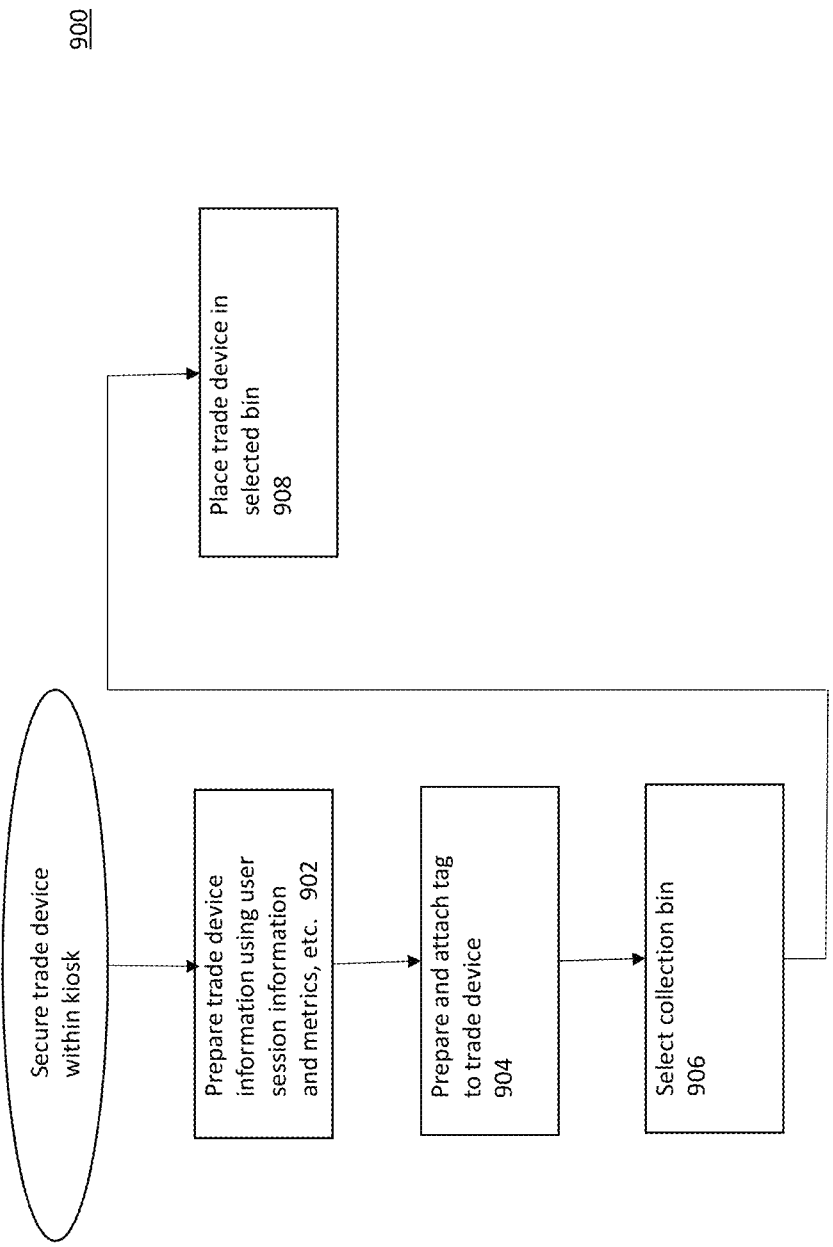

FIG. 23 illustrates a flowchart of a process 900 for securing the trade device within the kiosk. Process 900 may include operations 902-908. According to an embodiment process 900 may be executed when performing operation 870.

At operation 902, trade device information such as type of device, model information, manufacture information, obtained metrics, configurations, etc. are prepared from the user session and/or the obtained metrics.

At operation 904, the prepared information is printed on a tag (e.g., some type of sticker). An inventory tracking number may also be generated (unless already generated) and printed on the tag. The prepared tag is attached to the trade device. Some embodiments may include a robotic arm or the like that can be controlled by the kiosk to attach the tag to the trade device. In another embodiment, a Bluetooth tracking tag, RFID tag or the like may be attached to each trade device. The tracking information, along with the transaction information, is subsequently transferred to a central server for coordinating operations throughout the network of kiosks. Moreover, additionally or alternatively, a Bluetooth tracking device can be attached or somehow positioned in the kiosk to enable tracking of the kiosk. For example, such a tracking device may enable the kiosk, even if moved without authorization, to be tracked by either transmitting its location to a predetermined server, or by enabling nearby Bluetooth enabled devices (e.g., smartphones etc.) running a tracking program to detect the presence of the kiosk.

At operation 906, a collection bin is selected. In some embodiments, each kiosk is configured with multiple collection bins. The trade devices may be categorized in accordance with their device type, value, or some other criteria, such that they may be collected in different bins. For example, smartphones, tablet computers, and smart watches, may be directed to different bins.

At operation 908, the trade device is placed into, or dropped in, the selected bin.

Subsequently, the retail or premise operator may collect the trade devices from the different bins and ship them to the kiosk operator or other service that is specified by the kiosk operator.

Figure 24:
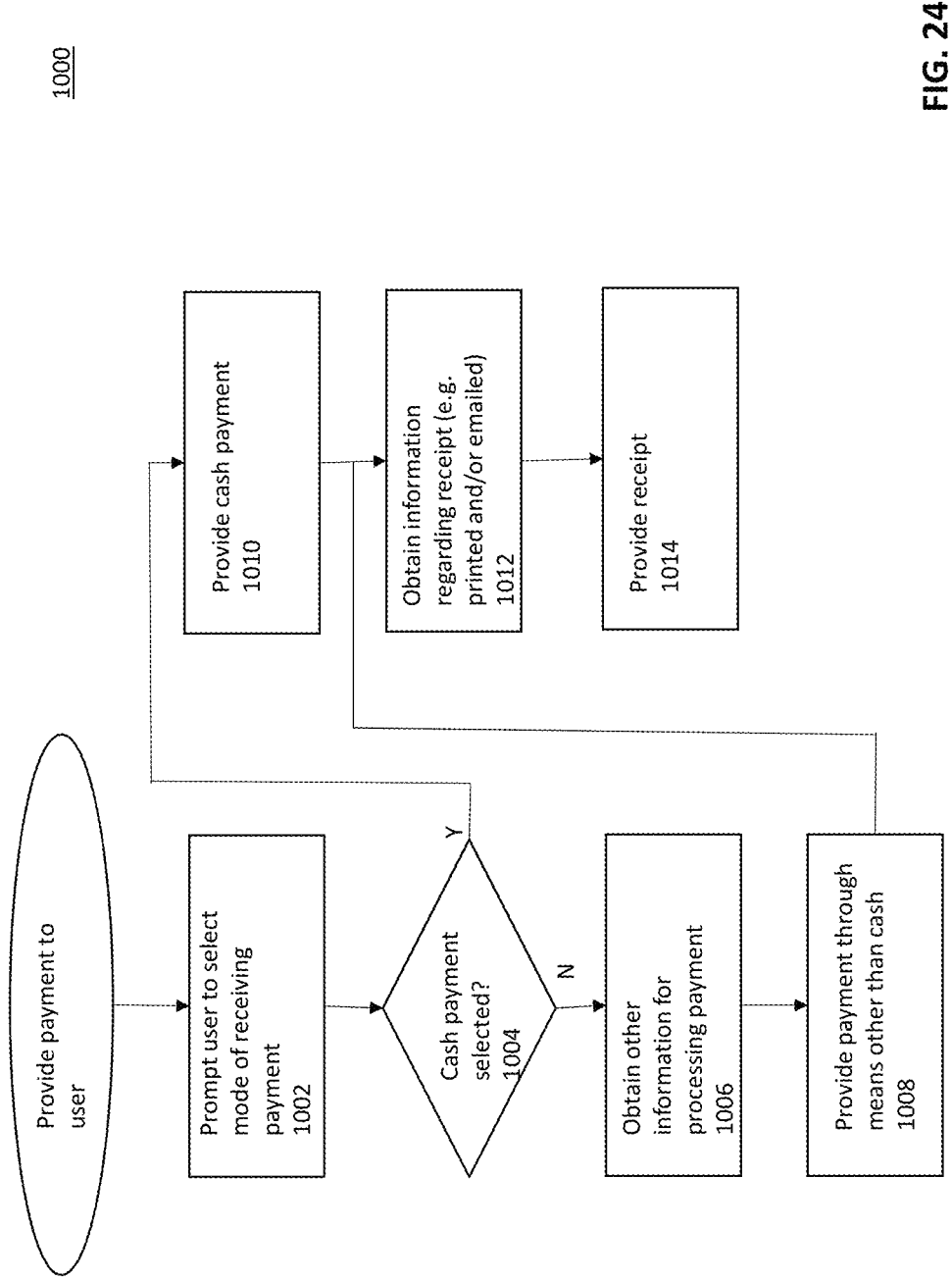

FIG. 24 illustrates a flowchart of a process 1000 for providing payment to the client. Process 1000 may include operations 1002-1014. According to an embodiment process 1000 may be executed when performing operation 872.

At operation 1002, the client is prompted to select the mode of receiving the payment. The prompt may be displayed on the screen of the kiosk. The available modes may include, for example, one or more of, cash, coupon, credit to the client's Paypal or other specified account, or debit card.

At operation 1004, it is determined whether cash payment has been selected.

If the client selected cash payment, then at operation 1010, an amount of cash corresponding to the agreed upon payment value is provided to the client.

If the client selected another mode of payment than cash, then at operation 1006, additional information is obtained for processing the payment. The additional information may include, the exact mode of payment, account number etc.

After operation 1006, at operation 1008, the payment is provided through the selected other means. If the client has selected Paypal as the preferred payment option, then the specified account is credited with the amount of money corresponding to the agreed upon payment. If the client selected to receive a debit card, the kiosk encodes a debit card with the payment amount and outputs the card. Alternate payment methods such as electronic fund transfers directly to the client's apps (e.g., Venmo), gift cards or smart cards, can be contemplated in conjunction with the present invention After providing payment, by one of operation 1010 or 1008, process 1000 proceeds to operation 1012 where the client is prompted with respect to a receipt. The client may specify whether or not a receipt is desired and the mode of receiving the receipt.

At operation 1014, the receipt is provided. Providing the receipt may be by printing the receipt, and/or by emailing a copy of the receipt to the client at one or more specified email addresses.

Figure 25:
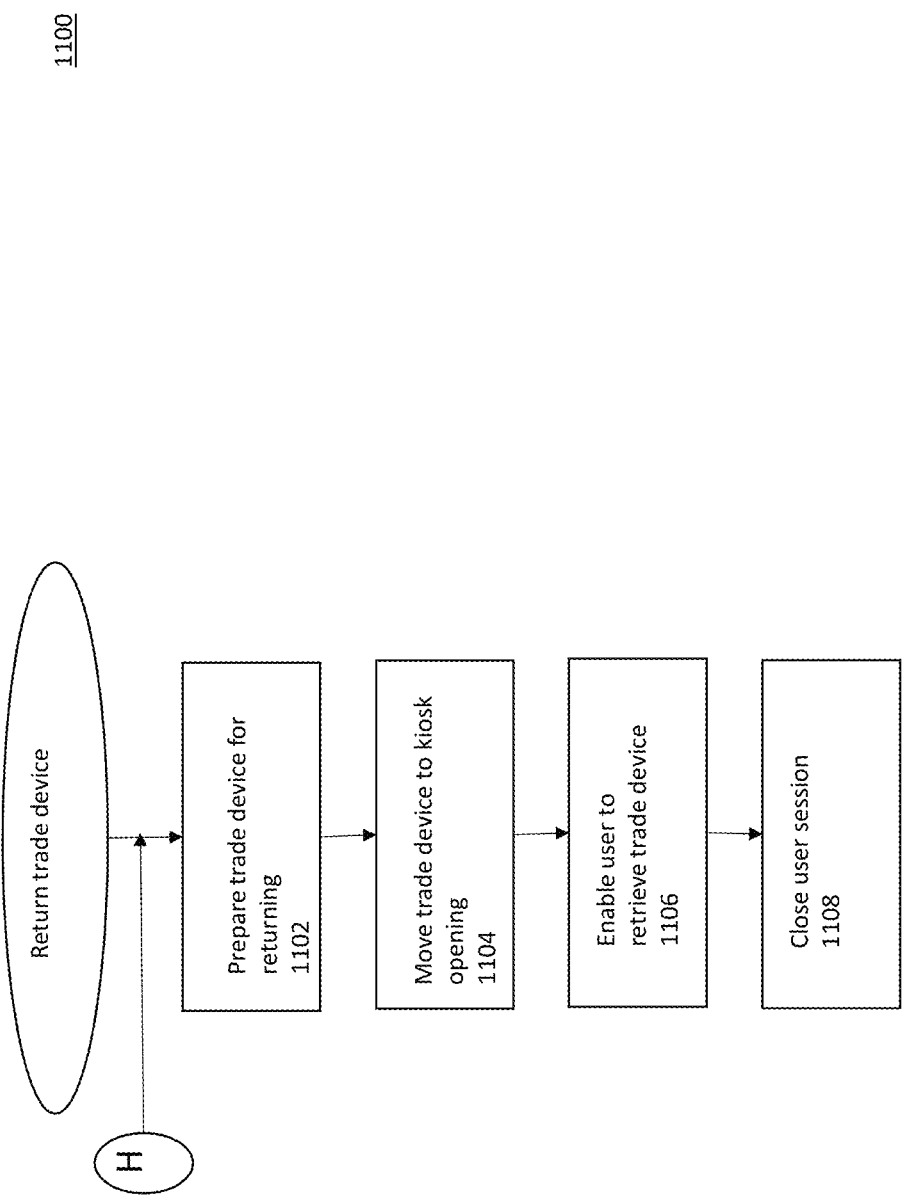

FIG. 25 illustrates a flowchart of a process 1100 for returning the trade device back to the client from the kiosk. Process 1100 may include operations 1102-1108. Returning of the trade device may be performed at any stage when the client cancels out of the transaction, or when the transaction is cancelled by the system for reasons such as the client rejecting the estimated amount, not accepting the agreement, the trade device not being eligible for trading or recycling.

At operation 1102, the trade device is prepared for returning. For example, if the kiosk app was being executed under control of the kiosk or call center operator, the app would be shutdown and/or any changes caused to the trade devices system would be reverted entirely or to some extent.

At operation 1104, the trade devices is conveyed back to the kiosk opening from the scanning area.

At operation 1106, the client is prompted to collect the trade device from the kiosk opening. The door to the kiosk opening may be electronically controlled to facilitate retrieval.

At operation 1108, the user session is closed. Closing of the user session may include archiving and/or storing a copy of the session.

Figure 26:
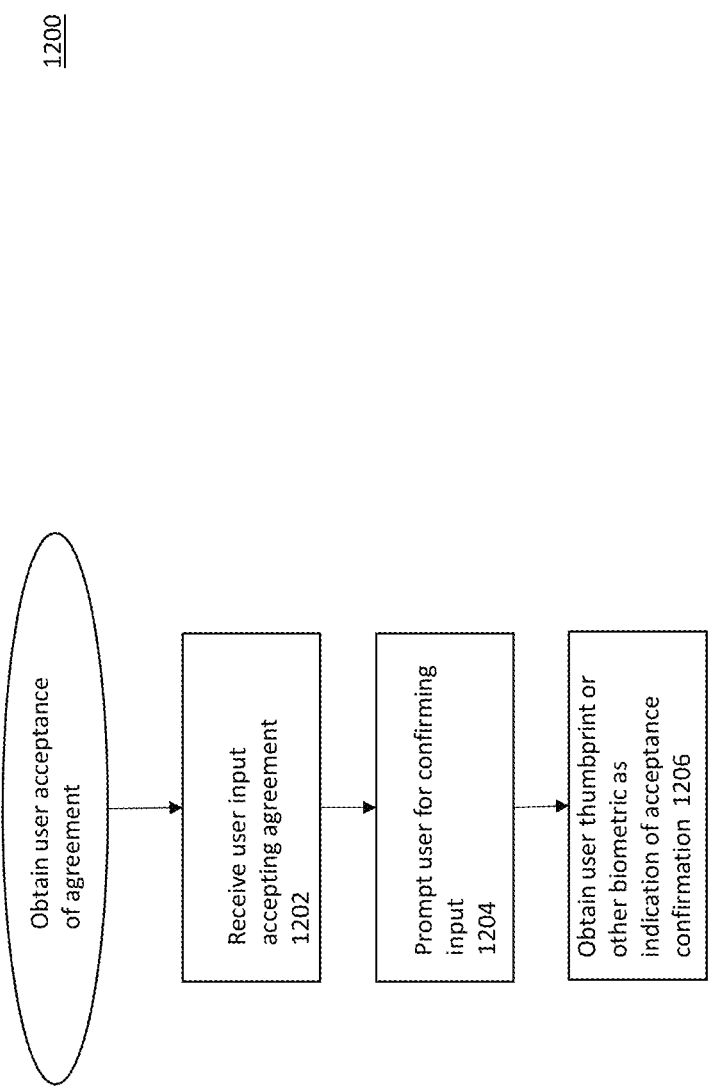

FIG. 26 illustrates a flowchart of a process 1200 for obtaining the client's approval of the trade agreement. Process 1200 may include operations 1202-1206. According to an embodiment process 1200 may be executed when performing operation 868, for example, prompting the client to indicated whether he/she accepts the agreement.

At operation 1202, an input from the client is received indicating that the acceptance of the agreement. For example, the client may have touched the displayed virtual button corresponding to the acceptance.

At operation 1204, the client is prompted for providing confirmation of the acceptance. The prompting may be via the screen of the kiosk. For example, the client may be requested to provide a thumbprint as confirmation of the acceptance. In some embodiments, a different biometric can be used as a confirmation of acceptance, for example an eye scan, voice recognition, facial pattern recognition, etc.

At operation 1206, the thumbprint reader is activated to obtain the client's confirmation.

Figure 27:
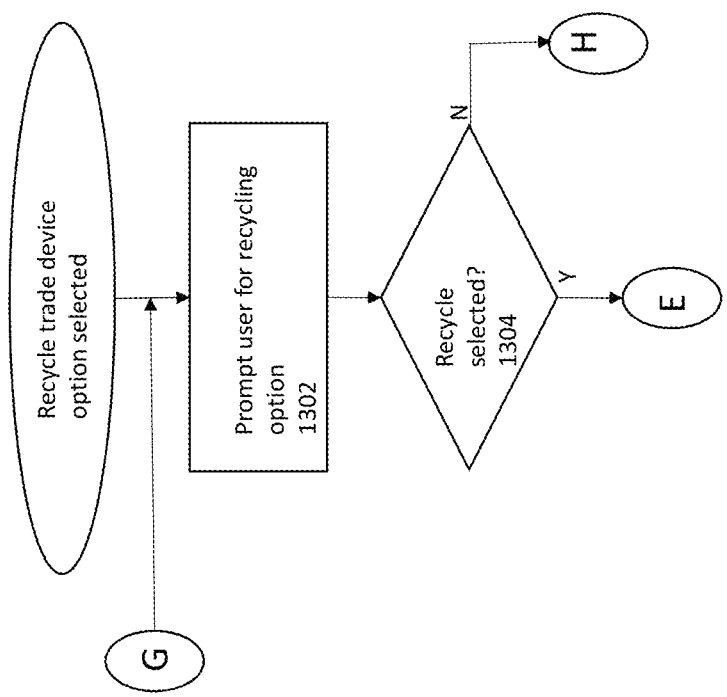

FIG. 27 illustrates a flowchart of a process 1300 for determining whether to recycle the trade device. Process 1300 may include operations 1302-1304. According to an embodiment process 1300 may be executed when performing operation 860 determines that the trade device does not have a tradeable value.

At operation 1302, the client is prompted to accept the option to recycle the trade device. For example, such an option may be provided when the system determined that the trade device does not have sufficient tradeable value.

At operation 1304, it is determined whether the user has selected the recycle option. Subsequently, the process may proceed to present the client with an agreement and collect the trade device for recycling.

Figure 28:
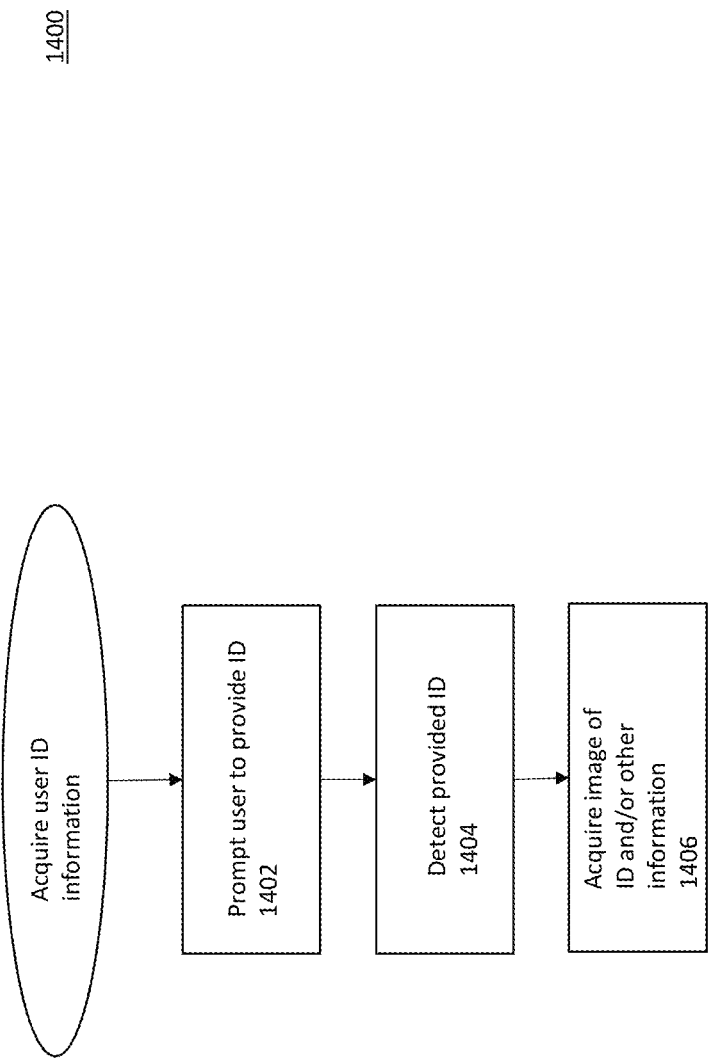

FIG. 28 illustrates a flowchart of a process 1400 for obtaining client identifying information. Process 1400 may include operations 1402-1406. According to an embodiment process 1400 may be executed when performing operation 810.

At operation 1402, the client is prompted to provide an ID.

At operation 1404, the ID unit is monitored to detect insertion of an ID by the client.

At operation 1406, upon detecting that an ID has been inserted into the ID unit, the ID is scanned/photographed. In some embodiments, additional and/or supplementary information may be obtained from the client. For example, the client may be required to manually enter a phone number, zip code etc. to aid in the identifying process.

Figure 29:
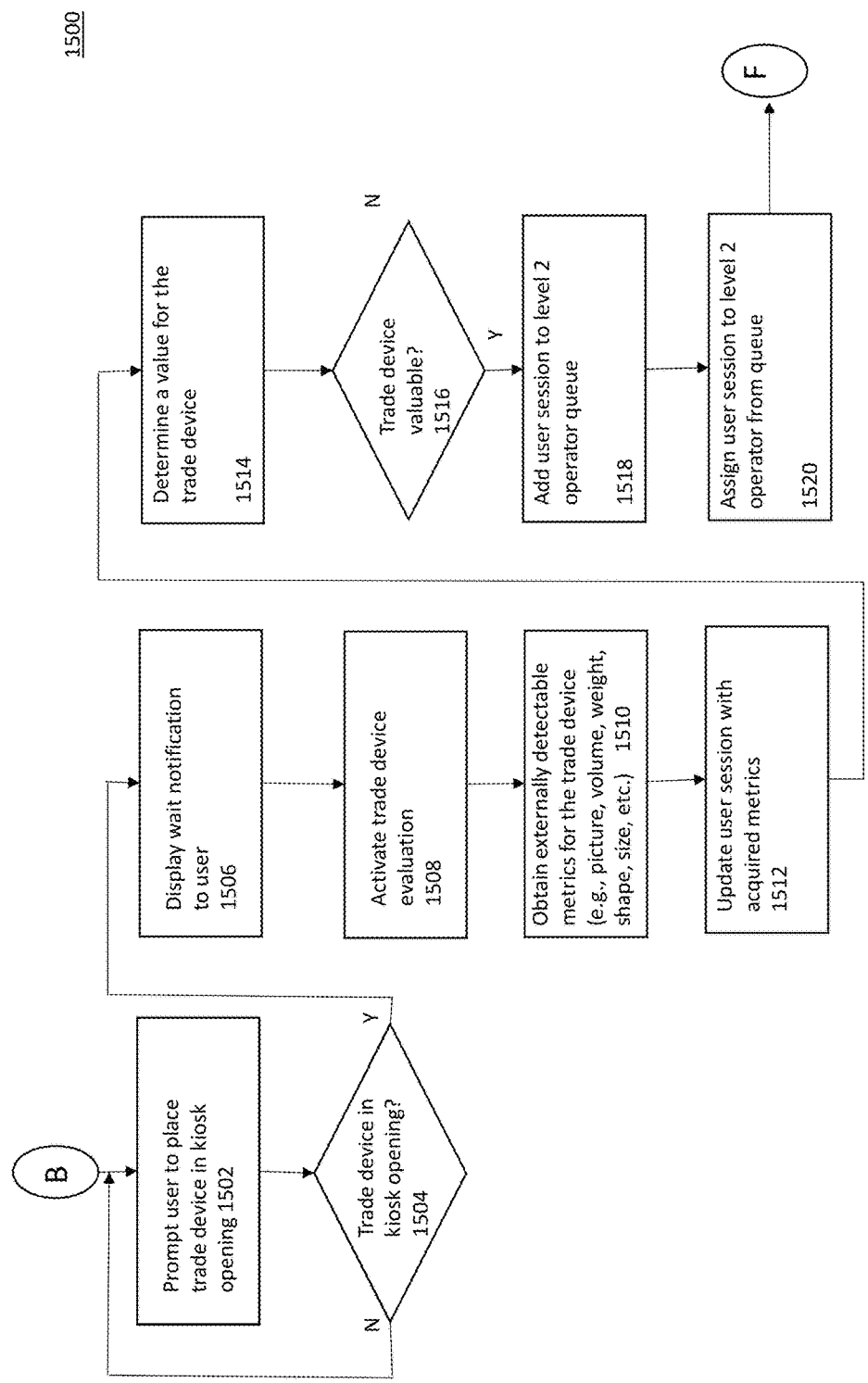

FIG. 29 illustrates a flowchart of a process 1500 for processing the trade device when the trade device cannot run or for some reason does not run the kiosk app. Process 1500 may include operations 1502-1520. According to an embodiment process 1500 may be executed when performing operations 824 or 828.

At operation 1502, the client is prompted to place the trade device in the kiosk opening At operation 1504, the kiosk opening is monitored to detect the presence of the trade device.

When the trade device is detected, at operation 1506, a notification is displayed requesting the client to wait until the device is evaluated.

At operation 1508, trade device evaluation is activated. This includes moving the trade device into the scanning chamber form the kiosk opening area.

At operation 1510, the evaluation of the trade device in the scanning chamber is performed. The evaluation includes detecting externally visible metrics such as size, shape, other visible characteristics that are determinable by capturing images of the trade device. Characteristics such as weight etc. may also be detected. However, because the kiosk app is not active, certain internal metrics are unavailable.

At operation 1512, the user session is updated with obtained metrics.

At operation 1514, a value is determined for the trade device. The determination may be based upon the metrics obtained in the above operations.

At operation 1516, it is determined whether the trade device has sufficient tradeable value. If no, the trade device may be considered for recycling or returned to the client. If yes, the process 500 proceeds to operation 1518 where the corresponding user session is assigned to a call center operator. In some embodiments, in this scenario where the kiosk app is not able to run on the trade device, the user session is queued to be assigned to a level 2 operator.

The queue servicing may be based upon the round robin discipline such that waiting clients at different kiosks are fairly treated. At operation 1520, the user session is assigned to an available level 2 operator. Level 2 operators are authorized and equipped for a greater level of engagement with the client than the level 1 operators.

Figure 30:
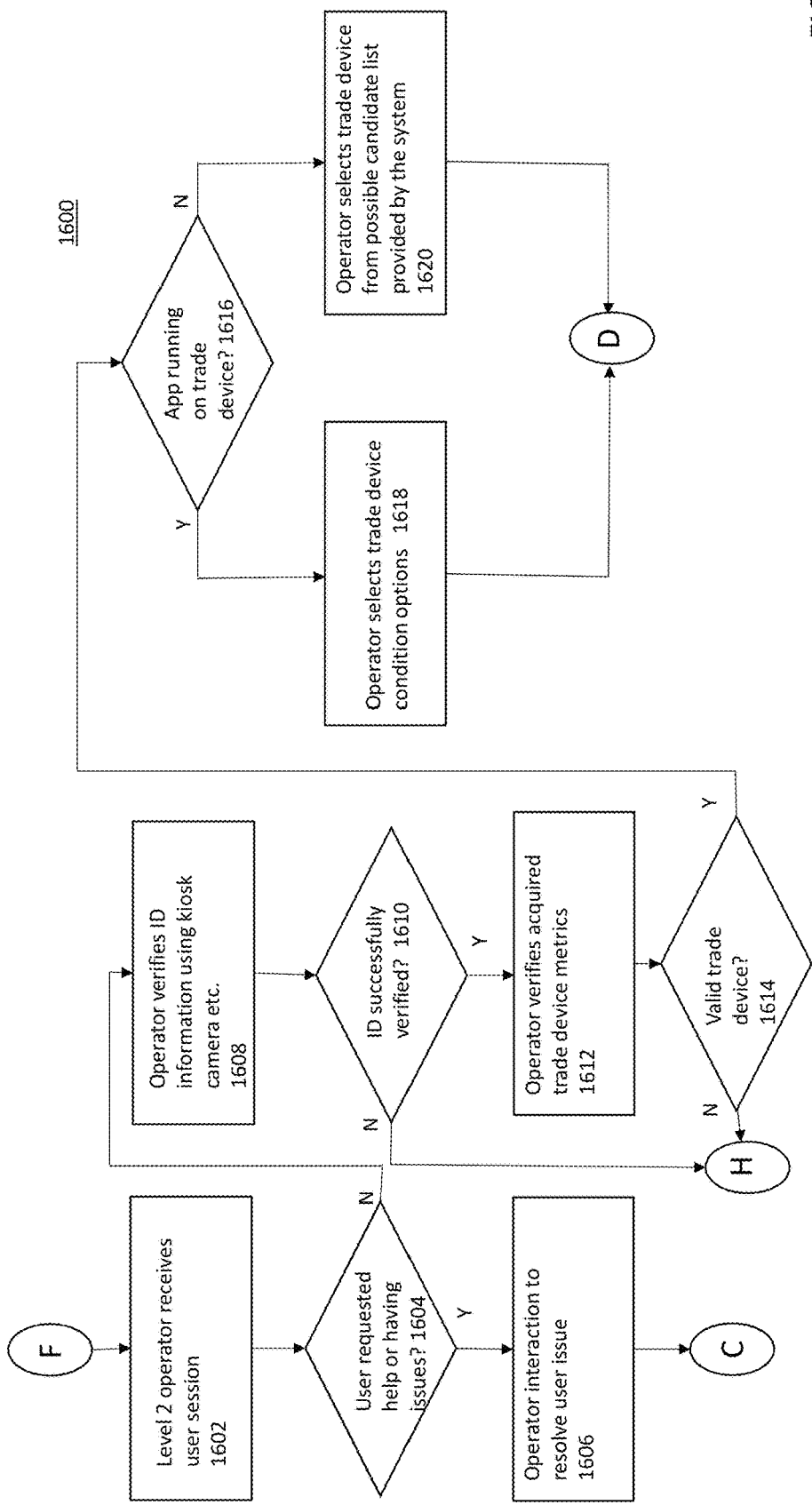

FIG. 30 illustrates a flowchart of a process 1600 for processing of a user session by a level 2 operator. Process 1600 may include operations 1602-1620. According to an embodiment process 1600 may be executed when, for example, a user session for transaction related to a trade device which does not run the kiosk app.

At operation 1602, the user session is obtained by the assigned level 2 call center operator.

At operation 1604, the operator determines whether the client has requested help or assistance.

If the client has indicated that he is having an issue, then at operation 1606, the operator directly interacts with the client to resolve the issues.

If the client has not indicated that he is having an issue, then at operation 1608, the operator may use one or more of the kiosk cameras and/or microphone/speaker to further corroborate or determine the client provided ID information.

At operation 1610, if the ID is successfully verified, the process 1600 may proceed to operation 1612 at which the operator may verify the acquired trade device metrics.

At operation 1614, it is determined whether the trade device is a valid device.

At operation 1616, it is again determined whether the kiosk app is running in the trade device.

If it is determined that the app is now running on the trade device, at operation 1618, the operator may utilize the app to further determine conditions of the trade device.

In the case that the app is not running on the trade device, or where the app is running, after certain trade device conditions are determined with the help of the app, at operation 1620, the operator may select a device option from a list of devices selected by the system.

Although particular embodiments have been described above, a person of skill in the art having been provided with this disclosure, would appreciate aspects of the different embodiments may be used in various combinations to realize still other embodiments of a sensor-attached anchor.

While the embodiments presented herein have been described in detail, the foregoing description is in all aspects illustrative and not restrictive. It is understood that numerous other modifications and variations can be devised without departing from the scope of the disclosed embodiments.

What is claimed is:

1. A kiosk for accepting a portable electronic device from a client in exchange for payment, comprising:
   at least one display;
   one or more cameras;
   a portable device receiving arrangement;
   a payment dispensing arrangement;
   at least one communication connection to a remote server and/or operator; and
   at least one processor configured to:
      in conjunction with the remote server and/or operator, control (1) an application program executing on the portable electronic device to display selected patterns on a display of the portable electronic device or play selected audio files over speakers of the portable electronic device and (2) the one or more cameras or one or more microphones of the kiosk to, concurrently with (1), capture one or more images of the display of the portable electronic device or sound from the speakers to detect characteristics of the portable electronic device based on the captured one or more images or the sound;
      determining a value for the portable electronic device based upon aspects including the detected characteristics, and displaying the determined value on said at least one display for approval by the client;
      based upon the determined value, provide a payment to the client via the payment dispensing arrangement; and
      deposit the portable electronic device in the kiosk for subsequent collection.

2. The kiosk according to claim 1, wherein the at least one processor is further configured to, in response to detecting the portable electronic device, prompt the client to execute the application program on the portable electronic device.

3. The kiosk according to claim 1, wherein the at least one processor is further configured to control the application program executing on the portable electronic device to play selected audio files over speakers of the portable electronic device and to control the one or more microphones of the kiosk to receive said audio output from the speakers and to either analyze the received audio at the kiosk or transmit the received audio to the remote server and/or operator.

4. The kiosk according to claim 1, wherein the at least one processor is further configured to detect said displayed selected patterns and to either analyze the detected patterns at the kiosk or transmit information regarding the detected pattern to the remote server and/or operator.

5. The kiosk according to claim 1, wherein the at least one processor is further configured to coordinate the display of the selected patterns on the display of the portable electronic device and transmission of images and/or audio of the portable electronic device to the server and/or operator.

6. The kiosk according to claim 1, wherein the at least one processor is further configured to mechanically move the portable electronic device while capturing images of it.

7. The kiosk according to claim 1, wherein the at least one processor is further configured to move one or more the cameras while capturing images of the portable electronic device.

8. The kiosk according to claim 1, wherein the controlling of the application program further includes any of (1) using a camera of the portable electronic device to capture one or more images and causing the portable electronic device to transmit the captured one or more images to the kiosk, to the remote server and/or operator, (2) using a microphone of the of the portable electronic device to capture one or more sounds played by the kiosk and causing the portable electronic device to transmit the captured one or more sounds to the kiosk, to the remote server and/or operator, (3) causing the portable electronic device to capture one or more accelerometer readings while the portable electronic device is being mechanically moved and causing the portable electronic device to transmit the captured one or more accelerometer readings to the kiosk, to the remote server and/or operator, and (4) causing the portable electronic device to capture one or more readings of signal strength of a wireless signal or a cellular signal while the portable electronic device is being mechanically moved and causing the portable electronic device to transmit the captured one or more readings of signal strength to the kiosk, to the remote server and/or operator.

9. The kiosk according to claim 1, wherein the at least one processor is further configured to display a plurality of questions to the client on the at least one display, wherein the plurality of questions is dynamically selected based upon a determined type of the portable electronic device and/or a determined characteristic of the client.

10. The kiosk according to claim 1, wherein the at least one processor is further configured to display a plurality of questions to the client on the at least one display, wherein the plurality of questions is dynamically selected based upon said detected characteristics of the portable electronic device.

11. The kiosk according to claim 1, further comprising a plurality of connectors for portable electronic devices, wherein the at least one processor is further configured to selectively provide the client with a connector from the plurality of connectors based upon a determined type of the portable electronic device.

12. The kiosk according to claim 1, wherein the kiosk further comprises an electronically controlled door for accessing the portable device receiving arrangement, and wherein the at least one processor is further configured to open the electronically controlled door upon command from the remote server and/or operator.

13. The kiosk according to claim 1, wherein the electronically controlled door is controlled by the at least one processor to open in different amounts according to a determined type of the portable electronic device.

14. The kiosk according to claim 1, further comprising a housing, wherein a first camera and a second camera are arranged on the front of the housing such the first camera view includes substantially all of the area in front of the kiosk in which the client may stand while using the kiosk, and the second camera view includes an access door of the payment dispensing arrangement.

15. The kiosk according to claim 1, further comprising an accessory bin with an electronically controlled door.

16. The kiosk according to claim 1, further comprising a fingerprint scanner configured to obtain a fingerprint of the client, wherein the at least one processor is further configured to associate the fingerprint with an agreement relating to transfer ownership of the portable electronic device.

17. The kiosk according to claim 1, further comprising a client id scanner configured to scan a client id to obtain a scanned client id, wherein the at least one processor is further configured to transmit an image of the client captured by one of the cameras and the scanned client id to the remote server and/or operator.

18. The kiosk according to claim 1, further comprising a charging station configured to deliver a predetermined amount of charge to a plugged in device.

19. A system comprising:
a plurality of call center terminals;
at least one central server;
a network communicatively connecting the plurality of call center terminals and the at least one central server; and
a plurality of kiosks, each kiosk configured for accepting a portable electronic device from a client in exchange for payment, and comprising:
at least one display;
one or more cameras;
a portable device receiving arrangement;
a payment dispensing arrangement; and
at least one processor configured to:
in conjunction with the central server and/or an operator at one of the call center terminals, control (1) an application program executing on the portable electronic device to display selected patterns on a display of the portable electronic device or play selected audio files over speakers of the portable electronic device and (2) the one or more cameras or one or more microphones of the kiosk to, concurrently with (1), capture one or more images of the display of the portable electronic device or sound from the speakers to detect characteristics of the portable electronic device based on the captured one or more images or the sound;
determining a value for the portable electronic device based upon aspects including the detected characteristics, and displaying the determined value on said at least one display for approval by the client;
based upon the determined value, provide a payment to the client via the payment dispensing arrangement; and
deposit the portable electronic device in the kiosk for subsequent collection.

20. The kiosk according to claim 3, wherein the at least one processor is configured to, in conjunction with the remote server and/or operator, control the application program to play selected audio files over speakers of the portable electronic device and to concurrently capture the sound from the speakers of the portable electronic device, and to either analyze the received audio at the kiosk or transmit the received audio to the remote server and/or operator.

\* \* \* \* \*